(12) United States Patent
Robinson

(10) Patent No.: US 12,016,255 B2
(45) Date of Patent: Jun. 25, 2024

(54) METHODS AND APPARATUS TO CONTROL VEHICLE STEERING

(71) Applicant: Deere & Company, Moline, IL (US)

(72) Inventor: William Daniel Robinson, Ames, IA (US)

(73) Assignee: Deere & Company, Moline, IL (US)

(*) Notice: Subject to any disclaimer, the term of this patent is extended or adjusted under 35 U.S.C. 154(b) by 270 days.

(21) Appl. No.: 16/906,853

(22) Filed: Jun. 19, 2020

(65) Prior Publication Data

US 2021/0000005 A1 Jan. 7, 2021

Related U.S. Application Data

(60) Provisional application No. 62/870,898, filed on Jul. 5, 2019.

(51) Int. Cl.
*A01B 69/04* (2006.01)
*G05D 1/00* (2006.01)
*G05D 3/12* (2006.01)

(52) U.S. Cl.
CPC ......... *A01B 69/008* (2013.01); *G05D 1/0088* (2013.01); *G05D 1/0274* (2013.01); *G05D 1/0278* (2013.01); *G05D 3/12* (2013.01)

(58) Field of Classification Search
CPC .. A01B 69/008; G05D 1/0088; G05D 1/0274; G05D 1/0278; G05D 3/12;

(Continued)

(56) References Cited

U.S. PATENT DOCUMENTS

| | | | |
|---|---|---|---|
| 10,095,237 B2* | 10/2018 | Li | G05D 1/0278 |
| 2005/0043867 A1* | 2/2005 | Kudo | B62D 1/286 |
| | | | 701/25 |

(Continued)

FOREIGN PATENT DOCUMENTS

| | | | | |
|---|---|---|---|---|
| CN | 106941395 A | * | 7/2017 | G01S 19/39 |
| CN | 105372078 B | * | 4/2018 | G01M 17/06 |

(Continued)

OTHER PUBLICATIONS

Machine translation of SU809076A1 retrieved from IP.com on Jun. 2, 2022 (Year: 2022).*

(Continued)

*Primary Examiner* — Fadey S. Jabr
*Assistant Examiner* — Faris Asim Shaikh
(74) *Attorney, Agent, or Firm* — HANLEY, FLIGHT & ZIMMERMAN, LLC

(57) ABSTRACT

Methods, apparatus, systems and articles of manufacture are disclosed that control vehicle steering. An example apparatus includes: a path acquisition interface configured to obtain, via a user interface a sampling interval; and a controller configured to, during acquisition mode: determine a steering angle of a wheel of the vehicle based on a trigonometric function including a distance associated with a turn radius of the front wheel; and cause, utilizing the steering angle, a global navigation satellite system (GNSS) receiver to travel from a first position to a second position, the GNSS receiver located at the first position at a first sampling time and the second position at a second sampling time, the first sampling time and the second sampling time differing by the sampling interval.

20 Claims, 12 Drawing Sheets

(58) Field of Classification Search
CPC ......... G05D 2201/0201; G05D 1/0212; G05D 1/02; G05D 1/0221; G05D 1/0223; G05D 2201/0213; G05D 2201/0216; G05D 2201/0212; B60W 30/18; B60W 40/00; B60W 50/08; B60W 50/14; B60W 2050/146; B60W 2040/1384; B60W 2050/0034; B60W 2050/0037; B60W 2050/046; B60W 10/20; B60W 30/10; B60W 2540/18; B60W 2710/207; B60W 2720/20; B60W 40/101; B60W 50/0097; B62D 6/002; B62D 6/00; B62D 13/04; B62D 15/0285; B62D 13/005; B62D 7/159; B62D 6/003; B62D 5/091; B62D 6/005; B60T 2210/36; B60T 8/172; B60T 2201/087; G01C 21/28; G01C 21/16; G01C 21/36; B60Q 2300/134; B60Q 1/346; B60Y 2300/14; G01S 19/01; G01S 19/07; G08G 1/0968; Y02T 90/16
See application file for complete search history.

(56) References Cited

U.S. PATENT DOCUMENTS

| | | | |
|---|---|---|---|
| 2006/0041354 A1* | 2/2006 | Schick | G05D 1/0278 701/472 |
| 2006/0095188 A1* | 5/2006 | Post, II | B60W 40/11 180/408 |
| 2006/0142936 A1 | 6/2006 | Dix | |
| 2007/0083308 A1* | 4/2007 | Hara | B62D 15/024 701/41 |
| 2009/0260907 A1* | 10/2009 | Moshchuk | B62D 15/0285 701/28 |
| 2013/0073147 A1* | 3/2013 | Tashiro | B66F 9/07568 701/42 |
| 2013/0304300 A1 | 11/2013 | Peake et al. | |
| 2014/0229072 A1* | 8/2014 | Kang | B62D 7/159 701/42 |
| 2016/0139599 A1* | 5/2016 | Czlapinski | B62D 53/06 701/41 |
| 2016/0313735 A1* | 10/2016 | Berkemeier | A47L 11/4072 |
| 2016/0313737 A1 | 10/2016 | Berkemeier | |
| 2017/0313352 A1* | 11/2017 | Li | G05D 1/0278 |
| 2017/0355397 A1* | 12/2017 | Watanabe | B62D 6/003 |
| 2019/0197322 A1* | 6/2019 | Suzuki | G06T 7/73 |
| 2020/0369257 A1* | 11/2020 | Hu | B60W 10/20 |

FOREIGN PATENT DOCUMENTS

| | | | | |
|---|---|---|---|---|
| JP | 2005067484 A | * | 3/2005 | |
| JP | 2012098270 | | 5/2012 | |
| JP | 2019070544 A | * | 5/2019 | B60R 11/02 |
| KR | 100915121 B1 | | 9/2009 | |
| KR | 100925883 B1 | * | 11/2009 | G01B 21/20 |
| SU | 809076 A1 | * | 2/1981 | G05D 1/00 |
| WO | WO-2017037354 A1 | * | 3/2017 | B60W 30/12 |

OTHER PUBLICATIONS

Machine translation of JP2019070544A retrieved from Espacenet on Jun. 2, 2022 (Year: 2022).*
Machine translation of KR-100925883-B1 retrieved from KIPO on Oct. 17, 2022 (Year: 2022).*
A data fusion system of GNSS data and on-vehicle sensors data for improving car positioning precision in urban environments (Year: 2017).*
Steering angle adaptive estimation system based on GNSS and MEMS gyro (Year: 2018).*
The use of GPS based velocity measurements for measurement of slide slip and wheel slip (Year: 2002).*
Trigonometry—Proof of $\_arctan(x) = \_arcsin(x\_sqrt\{1+x^{\wedge}2\})\$$—Mathematics Stack Exchange (Year: 2013).*
Translation of CN-105372078-B retrieved from Espacenet on Jun. 1, 2023 (Year: 2023).*
Translation of CN-106941395-A retrieved from Espacenet on Jun. 21, 2023 (Year: 2023).*
Machine translation of JP-2005067484-A retrieved from Espacenet on Oct. 6, 2023 (Year: 2023).*
Machine translation of WO-2017037354-A1 retrieved from Espacenet on Nov. 3, 2023 (Year: 2023).*
European Search Report issued in counterpart application No. 20183507.1 dated Nov. 17, 2020 (10 pages).

* cited by examiner

```
function [ Yp, Ydtp ] = Eqn_1( damping, freq, LE, T, ydto )
% dr < 1
1  Yo = LE;
2  p = -damping * freq;
3  q = freq * sqrt(1 - damping^2);
4  c1 = Yo;
5  c2 = ( ydto - p * c1 ) / q;
6  Exp = exp( p * T );
7  Cos = cos( q * T );
8  Sin = sin( q * T );
9  Yp = Exp * ( c1 * Cos + c2 * Sin );
10 Ydtp = Exp * ( p * (c1 * Cos + c2 * Sin) + q * (-c1 * Sin + c2 * Cos ));
```

FIG. 5A

```
function [ Yp, Ydtp ] = Eqn_2( damping, freq, LE, T, ydto )
% dr = 1
1  Yo = LE;
2  m = -damping * freq;
3  c1 = Yo;
4  c2 = ydto - m * c1;
5  Exp = exp( m * T );
6  Yp = Exp * ( c1 + c2 * T );
7  Ydtp = Exp * ( m * ( c1 + c2 * T ) + c2 );
```

FIG. 5B

```
function [ Yp, Ydtp ] = Eqn_3( damping, freq, LE, T, ydto )
% dr > 1
1  Yo = LE;
2  m1 = -damping * freq + freq * sqrt( damping^2 - 1);
3  m2 = -damping * freq - freq*sqrt( damping^2 - 1 );
4  c1 = ( ydto - m2 * Yo ) / ( m1 - m2 );
5  c2 = ( ydto - m1 * Yo ) / ( m2 - m1 );
6  Exp1 = exp( m1 * T );
7  Exp2 = exp( m2 * T );
8  Yp = c1 * Exp1 + c2 * Exp2;
9  Ydtp = c1 * m1 * Exp1 + c2 * m2 * Exp2;
```

FIG. 5C

METHODS AND APPARATUS TO CONTROL VEHICLE STEERING

RELATED APPLICATION

This patent arises from an application claiming the benefit of U.S. Provisional Patent Application Ser. No. 62/870,898, which was filed on Jul. 5, 2019. U.S. Provisional Patent Application Ser. No. 62/870,898 is hereby incorporated herein by reference in its entirety. Priority to U.S. Provisional Patent Application Ser. No. 62/870,898 is hereby claimed.

FIELD OF THE DISCLOSURE

This disclosure relates generally to vehicle control, and, more particularly, to methods and apparatus to control vehicle steering.

BACKGROUND

In recent years, agricultural vehicles have become increasingly automated. Agricultural vehicles may semi-autonomously or fully-autonomously drive and perform operations on fields. Agricultural vehicles perform operations using implements including planting implements, spraying implements, harvesting implements, fertilizing implements, strip/till implements, etc. These autonomous agricultural vehicles include multiple sensors (e.g., Global Navigation Satellite System (GNSS), Global Positioning Systems (GPS), Light Detection and Ranging (LIDAR), Radio Detection and Ranging (RADAR), Sound Navigation and Ranging (SONAR), telematics sensors, etc.) to help navigate without the assistance, or with limited assistance, from human users.

BRIEF DESCRIPTION OF THE DRAWINGS

FIG. 5A is an illustration of example code that, when executed by a processor, solves for the desired path solution when the damping ratio is less than a threshold value.

FIG. 5B is an illustration of example code that, when executed by a processor, solves for the desired path solution when the damping ratio is a threshold value.

FIG. 5C is an illustration of example code that, when executed by a processor, solves for the desired path solution when the damping ratio is greater than a threshold value.

The figures are not to scale. In general, the same reference numbers will be used throughout the drawing(s) and accompanying written description to refer to the same or like parts.

Figure 1:
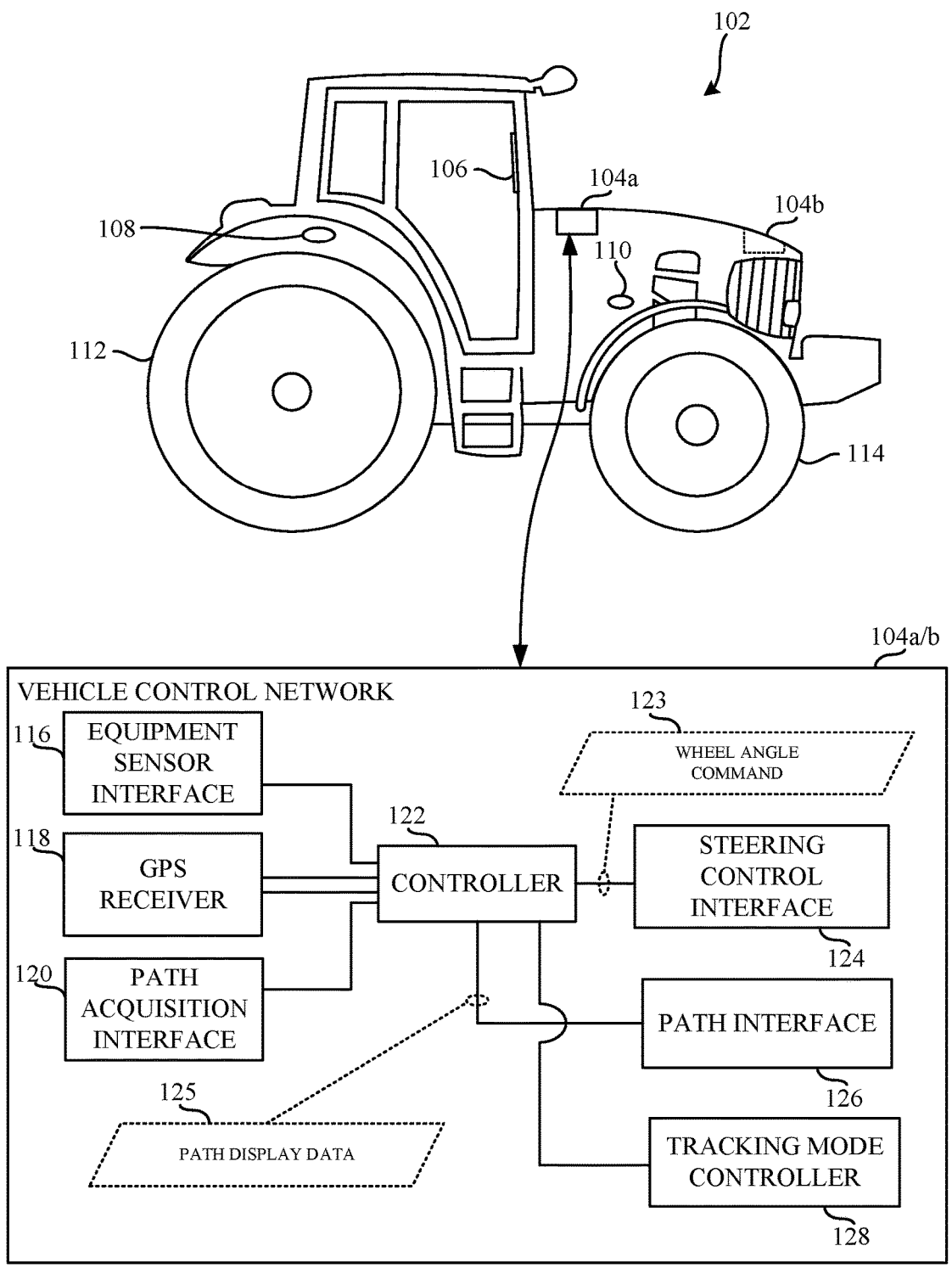
FIG. 1 is a schematic illustration of an example vehicle and an example vehicle control network to guide the vehicle.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Automation of agricultural vehicles is highly commercially desirable, as automation can improve the accuracy with which operations are performed, reduce operator fatigue, improve efficiency, and accrue other benefits. Automated vehicles move by following guidance lines. Conventional methods to generate guidance lines include using feedback control systems that rely on control parameters, and/or controller gains, to control a system. For example, such control parameters include proportional controllers, integral controllers, and derivative (PID) controllers. Such conventional controllers require at least four control parameters (e.g., controller gains) to control the vehicle in a particular mode of operation. A controller may have many different modes of operation including an acquisition mode of operation and a tracking mode of operation. As used herein, "tracking," "tracking mode," "tracking mode of operation," and/or their derivatives refer to following and/or tracking a guidance line. As used herein, "acquisition," "acquisition mode," "acquisition mode of operation," and/or their derivatives refer to getting to the guidance line, the path, and/or acquiring a position that is substantially similar to (e.g., within one meter of, within a half meter of, within two meters of, etc.) the guidance line.

While conventional controllers may be desirable to use when a vehicle has already acquired a guidance line (e.g., when the vehicle is in tracking mode), such conventional controllers become incredibly burdensome when controlling a vehicle as the vehicle acquires the guidance line (e.g., when the vehicle is in acquisition mode). For example, a vehicle may acquire a guidance line from many different positions. In some examples, the vehicle is parked. In other examples, the vehicle is operating in an agricultural field and being manually controlled. In further examples still, the vehicle is transitioning from one guidance line to another guidance line.

When using conventional design methods, in order to design a satisfactory controller that can reliably acquire a guidance line, many hours of vehicle operation are required to arbitrarily adjust the control parameters to determine multiple datasets of control parameters that can be used by a conventional controller to acquire a line from a location in an agricultural field or other environment. Each control parameter is a function of the vehicle position with respect to the guidance line and the speed the vehicle is to operate at to acquire the guidance line. Thus, during the design period, each of the control parameters must be individually tuned for a preset number of speeds and a preset number of distances from the guidance line.

Conventional controllers must include substantial memory allocated for the control parameter datasets for each mode of operation. For example, if a conventional controller includes four control parameters for acquisition mode operation, each control parameter must be tuned for a preset number of speeds (e.g., five) and preset number of distances from the guidance line (e.g., 5 meters). Each control parameter is usually a 3-digit number and with 100 control parameters to handle the five distances and five speeds, the resultant dataset that is stored requires at least 700 bits of memory. Adding additional control parameters (e.g., controller gains) will substantially increase the number of control parameters that must be stored by a conventional controller.

In addition to the already large memory required for each dataset that is stored, additional logic overhead is required to maintain, read, and write to the memory. With multiple different mode of operation, the amount of data required by a conventional controller to reliably control a vehicle can easily enter the range of kilobits and megabits.

Furthermore, during operation of a conventional controller, an end-user is incapable of effecting the rate at which the vehicle acquires the guidance line. This is undesirable to some end-users because such end-users prefer to have some control while operating the vehicle as opposed to an entirely autonomous driving control system.

As opposed to the conventional methods of control, the examples disclosed herein reduce the memory required to operate a controller including an acquisition mode of operation. Examples disclosed herein provide an efficient method for determining the wheel steering angle command to cause a vehicle to acquire a guidance line without the use of control parameters. For example, the examples disclosed herein determine a path for the vehicle and cause the vehicle to track that path while it acquires the guidance line without the use of control parameters (e.g., controller gains). Furthermore, examples disclosed herein control vehicles even where vehicle slippage (e.g., variation from the determined path due to environmental conditions) is a present because the examples disclosed herein update the path for the vehicle at each sampling interval (e.g., the time between a first sampling time and a second sampling time) of a GNSS receiver. Thus, the path of the vehicle to acquire the guidance line is based on the current position of the vehicle. Additionally, the examples disclosed herein actively determine the path of the vehicle and present the path to an end-user. The path that is presented is updated in real-time and shows the current position of the vehicle.

The examples disclosed herein allow for the real-time determination of a path to follow as the vehicle acquires a guidance line. The path to follow is determined based on a set formula that may be implemented by machine readable instructions. The examples disclosed herein determine the wheel angle command that is required to cause the GNSS receiver of the vehicle to acquire the path in real time (e.g., cause the GNSS receiver of the vehicle to acquire the desired path). For example, the controller of a vehicle implementing the examples disclosed herein determines a direction vector of the desired path of the vehicle at the sampling rate of the GNSS receiver and, utilizing machine kinematics and geometric principles, determines the steering angle to cause the velocity vector of the vehicle to point in the direction of the direction vector of the vehicle. Additionally, because the GNSS receiver data is updated at the sampling interval, any slippage that may occur due to environmental conditions is accounted for, preventing jerky and/or turbulent acquisitions of the guidance line. Moreover, the jerky and/or turbulent acquisition of the guidance line is prevented because the examples disclosed herein rely on the position that a vehicle actually reaches after each sampling interval of the GNSS receiver in order to determine the next desired position of the vehicle in the path to follow. In this manner, the path to follow is determined at the GNSS sampling frequency with a new starting position (e.g., the position the vehicle actually reached).

FIG. 1 is a schematic illustration of an example vehicle 102 and an example vehicle control network 104a to guide the vehicle 102. The vehicle 102 includes the vehicle control network 104a, an example user display 106, an example first sensor 108, an example second sensor 110, an example rear wheel 112, and an example front wheel 114. The vehicle control network 104a includes an example equipment sensor interface 116, an example GNSS receiver 118, an example path acquisition interface 120, an example controller 122, an example steering control interface 124, an example path interface 126, and an example tracking mode controller 128.

In the example illustrated in FIG. 1, the vehicle 102 is an agriculture vehicle (e.g., a tractor, front loader, harvester, cultivator, or any other suitable vehicle) configured to acquire and/or track a projected path. For example, the vehicle 102 may be a tractor capable of automatically tracking a row of crops to harvest the row of crops. In FIG. 1, the vehicle 102 is operable in a direction proportional to the direction of the front wheel 114 (e.g., the vehicle 102 is a front steer vehicle). In additional or alternative example, the vehicle 102 is operable in a direction proportional to the direction of the rear wheel 112 (e.g., the vehicle 102 is a rear steer vehicle). In examples disclosed herein, the vehicle 102 is equipped with the vehicle control network 104a to control and/or otherwise command the vehicle 102 to acquire and/or track a predetermined path. The vehicle control network 104a is explained in further detail with respect to the components in the vehicle control network 104a.

In FIG. 1, the example user display 106 included in the vehicle 102 is an interactive display in which a user may select and/or enter desired inputs (e.g., select a screen display, enter desired vehicle speed, enter aggressiveness variables, select the sampling interval, power on and/or off the vehicle, etc.) before, during, and/or after operation of the vehicle 102. In examples disclosed herein, the user may select aggressiveness variables via the user display 106 to alter how quickly the vehicle acquires the path. The aggressiveness variables includes a damping ratio that corresponds to the "smoothness" in which the vehicle travels during acquisition mode. For example, a lower damping ratio (e.g., less than 1.0) corresponds to larger variations from the desired path during acquisition mode (e.g., the vehicle 102 may overshoot the desired path which can be desirable in certain situations) but will reach the desired path more quickly. In yet another example, a higher damping ratio (e.g., greater than 1.0) may correspond to less variations from the desired path during acquisition mode (e.g., the vehicle 102 may undershoot the desired path which can be desirable in certain situations) but will reach the desired path less quickly. In examples disclosed herein, the natural frequency corresponds to the slope of the path taken during acquisition mode. For example, if a user selects a lower natural frequency (e.g., 0.8), the slope towards the desired path may be lesser. In yet another example, if a user selects a higher natural frequency (e.g., 0.8), the slope towards the desired path may be greater. In examples disclosed herein, the sampling ratio selected by the user refers to the desired interval in which to collect location data and/or calculate the projected path. In examples disclosed herein, the user may select and/or otherwise change the damping ratio, natural frequency, and/or sampling interval via a graphical user interface (GUI), push buttons, turn knobs, etc., on the user display 106. In examples disclosed herein, the user display 106 communicates with the vehicle control network 104a to relay and/or receive any of user inputs, example path display data 125, etc. In some examples disclosed herein, the user display 106 is a liquid crystal display (LCD) touch screen such as a tablet, a Generation 4 CommandCenter™ Display, a computer monitor, etc.

In the example illustrated in FIG. 1, the first sensor 108 is located near the rear end of the vehicle 102. The first sensor 108 is a velocity sensor that determines the speed and/or direction of the vehicle 102. The first sensor 108 communicates with the vehicle control network 104a to provide data representative of the vehicle's velocity. In other examples disclosed herein, the first sensor 108 may be located in and/or on any suitable section of the vehicle (e.g., the front of the vehicle 102, the roof of the vehicle 102, near the driver side, near the passenger side, etc.). Additionally, in other examples disclosed herein, the first sensor 108 may be any suitable sensor on the vehicle 102 such as a proximity sensor, wheel rotation per minute (RPM) sensor, a LIDAR sensor, etc.

In the example illustrated in FIG. 1, the second sensor 110 is located near the front end of the vehicle 102. The second sensor 110 is a wheel direction sensor that senses the position and/or angle in which the rear wheel 112 and/or the front wheel 114 is placed. The second sensor 110 communicates with the vehicle control network 104a to provide data representative the position of the rear wheel and/or the front wheel 114. In other examples disclosed herein, the second sensor 110 may be located in and/or on any suitable section of the vehicle (e.g., the front of the vehicle 102, the roof of the vehicle 102, near the driver side, near the passenger side, etc.). Additionally, in other examples disclosed herein, the second sensor 110 may be any suitable sensor on the vehicle 102 such as a proximity sensor, wheel rotation per minute (RPM) sensor, etc.

In the example illustrated in FIG. 1, the vehicle 102 includes the rear wheel 112 and the front wheel 114. In FIG. 1, the vehicle 102 operates in response to a direction of rotation (e.g., angle) of the front wheel 114. For example, if the user decides to turn left, the front wheel 114 is angled to the left. In examples disclosed herein, the rear wheel 112 is located on a rear wheel axle with another corresponding rear wheel. Likewise, in examples disclosed herein, the front wheel is located on a front wheel axle with another corresponding front wheel.

In FIG. 1, the equipment sensor interface 116 communicates with the first sensor 108 and/or the second sensor 110 to obtain data representative of the velocity of the vehicle 102 and the front wheel 114 turn angle. In examples disclosed herein, the equipment sensor interface 116 communicates with the controller 122 to provide the obtained vehicle sensor data. In some examples disclosed herein, the equipment sensor interface 116 may communicate via any suitable wired and/or wireless communication method to obtain vehicle 102 sensor data from, at least, the first sensor 108 and/or the second sensor 110. In some examples disclosed herein, the equipment sensor interface 116 may be an equipment sensor interface controller.

In the example illustrated in FIG. 1, the GNSS receiver 118 is located within the vehicle control network 104a in between the rear wheel 112 and the front wheel 114. In other examples (e.g., a rear steer vehicle), an alternative vehicle control network 104b may be located in front of (e.g., ahead of) the front wheel 114). In the example of FIG. 1, the rear wheel 112 of the vehicle 102 is on a rear wheel axle and the front wheel 114 is on a front wheel axle. As such, the GNSS receiver 118 is located in between the rear wheel 112 (e.g., the corresponding rear wheel axle) and the front wheel 114 (e.g., the corresponding front wheel axle). In other examples (e.g., a rear steer vehicle), the GNSS receiver 118 is located in front of the front wheel 114 (e.g., in front of the front wheel axle). In the example of FIG. 1, the GNSS receiver 118 is a GPS receiver. In other examples disclosed herein, the GNSS receiver 118 may be any suitable geo-spatial positioning receiver. The GNSS receiver 118 communicates with the controller 122 to provide and/or otherwise transmit the geographical location of the vehicle 102. More specifically, the GNSS receiver 118 is configured to transmit the geographical position of the GNSS receiver 118 in the vehicle 102. In examples disclosed herein, the GNSS receiver 118 samples the geographical location of the vehicle 102 at a threshold interval. For example, every 0.1 seconds, the GNSS receiver 118 may send the geographical location of the vehicle 102 to the controller 122. In examples disclosed herein, the GNSS receiver 118 may communicate with the path acquisition interface 120 and/or or the controller 122 to obtain the desired path in which the vehicle 102 is to travel and/or obtain a desired sampling frequency. In some examples disclosed herein, the GNSS receiver 118 may be a GNSS receiver controller.

During acquisition mode, the GNSS receiver 118 calculates the lateral error of the vehicle 102. For example, because during acquisition mode the vehicle 102 may or may not be at the geographical location corresponding with the desired position of the desired path, the GNSS receiver 118 may calculate the lateral error. In examples disclosed herein, the lateral error is the shortest distance between the GNSS receiver 118 and the desired path. In another example, the lateral error may be defined as the distance, perpendicular to the desired path, between the desired path and the GNSS receiver 118. In other examples disclosed herein, the GNSS receiver 118 may provide the geographical location of the vehicle 102, sampled at the threshold interval, to the controller 122 in which the controller 122 may calculate the lateral error of the vehicle. In examples disclosed herein, if the lateral error determined by the GNSS receiver 118 is less than a threshold distance (e.g., less than 1 meter), then the vehicle control network 104a may prompt control to the tracking mode controller 128 to initiate tracking mode. Likewise, in examples disclosed herein, if the lateral error determined by the GNSS receiver 118 is greater than and/or equal to a threshold distance (e.g., greater than and/or equal to 1 meter), then the vehicle control network 104a may prompt control to the controller 122 to initiate acquisition mode.

In the example illustrated in FIG. 1, the path acquisition interface 120 communicates with the user display 106, the GNSS receiver 118, and/or the controller 122. In examples disclosed herein, the path acquisition interface 120 communicates with the controller 122 to provide the obtained user provided parameters that alter the movement of the vehicle 102. For example, via the user display 106, a user may provide a damping ratio, a natural frequency, and/or a desired sampling interval. In such an example, the path acquisition interface 120 communicates the provided damping ratio, natural frequency, and/or desired sampling interval to the controller 122 and/or the GNSS receiver 118. In some examples disclosed herein, the path acquisition interface 120 may be a path acquisition interface controller.

In FIG. 1, the example controller 122 communicates with any of the equipment sensor interface 116, the GNSS receiver 118, the path acquisition interface 120, the steering control interface 124, the path interface 126, and/or the tracking mode controller 128 to calculate, display, and/or otherwise provide (e.g., project) the desired path in which the vehicle 102 is to travel. For example, for each desired sampling interval (e.g., the desired sampling interval set by the user via the user display 106), the controller 122 calculates the next position to which the vehicle 102 is to travel. The controller 122 calculates additional position steps until the vehicle 102 has acquired the desired path. In examples disclosed herein, the controller 122 determines the next position step (e.g., path solution step a time interval in the future) without the use of control parameters (e.g., without the use of controller gains). The controller 122 is explained in further detail below.

In the example illustrated in FIG. 1, the steering control interface 124 communicates with the controller 122 to obtain and/or otherwise receive an example wheel angle command 123. In examples disclosed herein, the wheel angle command 123 sent by the controller 122 is related to the calculated position step described above. For example, after the controller 122 calculates the position step for the given sampling interval, the wheel angle command 123 is sent to the steering control interface 124. In examples disclosed herein, the wheel angle command 123 is a numerical value representative of the degree in which to turn (e.g., angle) the front wheel 114 (e.g., 14 degrees, negative 30 degrees, etc.). The steering control interface 124 communicates with the vehicle 102 to alter the angle of steering for the front wheel 114. In some examples disclosed herein, the steering control interface 124 may be a steering control interface controller.

In the example illustrated in FIG. 1, the path interface 126 communicates with the controller 122 to obtain, receive, and/or otherwise transmit example path display data 125. In examples disclosed herein, the path display data 125 represents the projected path (e.g., path projection data) in which the vehicle 102 is to travel. The path interface 126 obtains and/or otherwise receives the path display data 125 from the controller 122 for each sampling interval. The path interface 126 communicates with the user display 106 the path display data 125 in order to display and/or transmit the projected path for the user. In some examples disclosed herein, the path interface 126 may be a path interface controller.

In the example illustrated in FIG. 1, the tracking mode controller 128 communicates with the GNSS receiver 118, and/or the controller 122 to initiate tracking mode in response to the GNSS receiver 118 and/or the controller 122 determining the lateral error of the vehicle 102 is less than a threshold distance. For example, if the threshold distance is 1 meter and if the GNSS receiver 118 and/or the controller 122 determines the lateral error of the vehicle 102 is 0.5 meters, then the GNSS receiver 118 and/or the controller 122 transmit control to the tracking mode controller 128 to initiate tracking mode. In other examples disclosed herein, the threshold distance may be any suitable distance (e.g., 0.1 meters, 3 meters, 1 foot, etc.).

Figure 2:
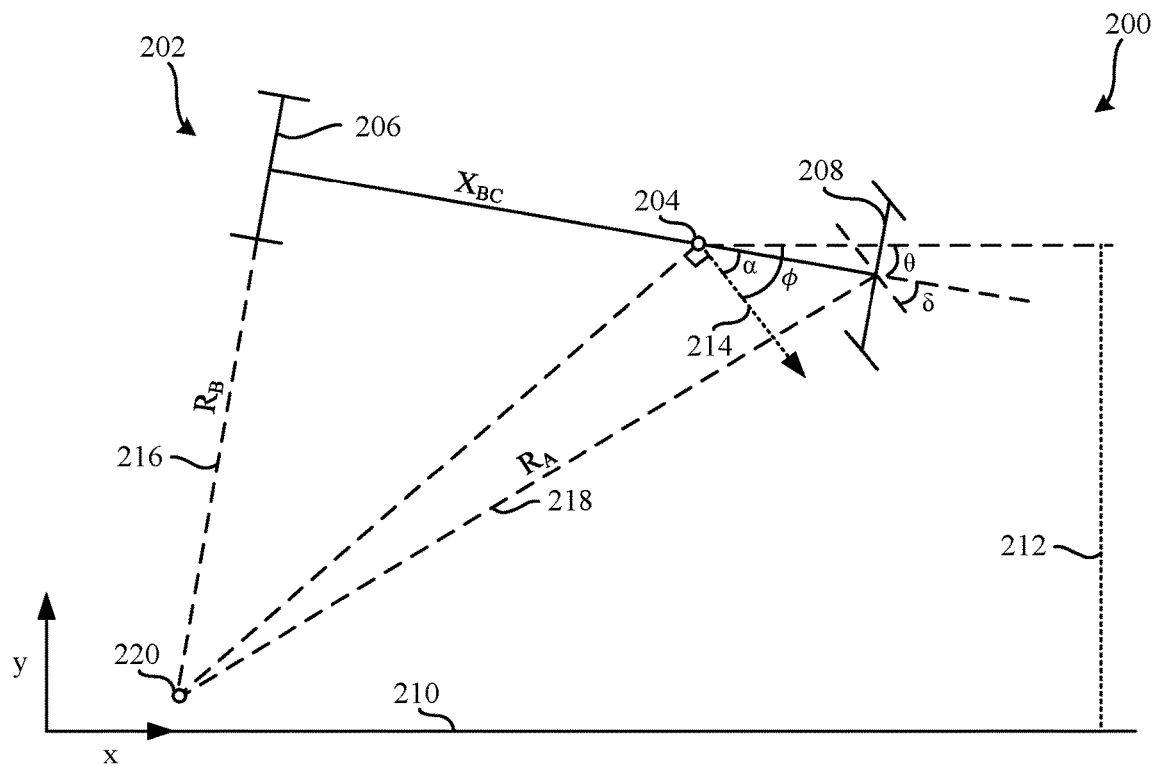
FIG. 2 is a kinematic illustration of a system including an example front wheel steered vehicle and an example GNSS receiver.

FIG. 2 is a kinematic illustration of a system 200 including an example vehicle 202 and an example GNSS receiver 204. The vehicle 202 is an example vehicle 202 illustrative of a front steer vehicle (e.g., the vehicle 102 of FIG. 1). The GNSS receiver 204 is an example GNSS receiver 204 illustrative of the GNSS receiver 118 of FIG. 1. In the example of FIG. 2, the example vehicle 202 includes an example rear wheel axle 206 and an example front wheel axle 208. In FIG. 2, the GNSS receiver 204 is located in between an example rear wheel axle 206 and an example front wheel axle 208. Moreover, in FIG. 2, the vehicle 202 is in acquisition mode and, as such an example path 210 represents the desired path to acquire. In examples disclosed herein, the path 210 may be any path, line, outline, tracing, etc., in which the vehicle 202 (or the vehicle 102) is to acquire. For example, the example path 210 is a computer generated line representing a column of agricultural crops that the vehicle 202 is to travel down. In other examples, the path 210 represents a road and/or other thoroughfare along which the vehicle 202 is to travel.

At the initiation of the acquisition mode, a controller (e.g., the controller 122 of FIG. 1) calculates a desired path solution a time interval in the future. Such a desired path solution may be determined utilizing the following equation.

$$\frac{d^2y}{dx_2} + 2(dr)(wn)\left(\frac{dy}{dx}\right) + (wn^2)y = 0 \qquad \text{Equation 1}$$

In Equation 1, the variable y represents the current measured lateral error (segment 212) obtained from the GNSS receiver 204, the variable x represents a distance variable parallel to the path 210 (e.g., the path to acquire) and the path 210, the variable $$\frac{dy}{dx}$$

represents me instantaneous slope of the "desired" path of the vehicle 202 at each time interval, the variable dr represents the damping ratio, and the variable wn represents the natural frequency. A controller (e.g., the controller 122 of FIG. 1) solves Equation 1 for each time interval and, as such, utilizes time steps (e.g., dt) instead of position steps (e.g., dx). Equations 2 and 3 below represent example conversions between time steps (e.g., dt) and position steps (e.g., dx).

$$\frac{dy}{dt} = \left(\frac{dy}{dx}\right)\left(\frac{dx}{dt}\right) \qquad \text{Equation 2}$$

$$\frac{dy}{dx} = \frac{dy/dt}{dx/dt} \qquad \text{Equation 3}$$

For example, the instantaneous slope of the path can be defined as the instantaneous rate of change of lateral error (e.g., the instantaneous rate of change of y). In such an example, the instantaneous rate of change of lateral error is the derivative of the lateral error (segment 212), y, with respect to time $$\left(\text{e.g.,}\ \frac{dy}{dt}\right)$$

divided by the instantaneous rate of change of the path along the x-axis (e.g., the instantaneous rate of change of the variable, x, parallel to the path) with respect to time $$\left(\text{e.g.,}\ \frac{dx}{dt}\right).$$

The instantaneous rate of change of the vehicle 202 along the x-axis (e.g., the instantaneous rate of change of the variable, x, parallel to the path) may be proportional to the path velocity along the x-axis, and the instantaneous rate of change of lateral error (e.g., the instantaneous rate of change of y) may be proportional to the path velocity along the y-axis.

In Equations 1-3, the magnitude of $$\frac{dx}{dt}$$

affects the spacing the calculated points along the x-axis. For example, a small $$\frac{dx}{dt}$$

produces more path points (finer grid spacing), and a larger $$\frac{dx}{dt}$$

produces fewer points (course grid spacing). In examples disclosed herein, $$\frac{dx}{dt}$$

represents the velocity of the vehicle 202.

In FIG. 2, a controller (e.g., the controller 122 of FIG. 1) determines the vehicle direction angle α utilizing an example path velocity vector angle ϕ and an example heading error angle θ. The path velocity vector angle ϕ is determined utilizing Equation 4, below.

$$\phi = -\sin^{-1}\left(\frac{(dy/dt)_0}{U}\right) \qquad \text{Equation 4}$$

In Equation 4, the variable $(dy/dt)_0$ represents one time interval solution to Equation 1, and the variable U represents the speed of the vehicle 202. In an example, $(dy/dt)_0$ may be considered the initial condition derived from the solution of Equation 1. The vehicle direction angle α represents the angle between the vehicle 202 and an example path velocity vector 214. In operation, the path velocity vector 214 represents the direction and speed in which the GNSS receiver 204 is traveling. The vehicle direction angle α is determined utilizing Equation 5, below.

$$\alpha = \phi - \theta \qquad \text{Equation 5}$$

In Equation 5, the variable ϕ is the path velocity vector angle determined utilizing Equation 4, and the variable θ represents the heading error angle.

In FIG. 2, a controller (e.g., the controller 122 of FIG. 1) utilizes the distance between the rear wheel axle 206 and the GNSS receiver 204 (e.g., $X_{BC}$), and the vehicle direction angle α, to determine an example rear wheel axle turn radius (segment 216). The rear wheel axle turn radius (segment 216) is determined utilizing Equation 6, below.

$$R_B = \frac{x_{BC}}{\tan|\alpha|} \qquad \text{Equation 6}$$

In Equation 6, the variable $R_B$ represents the rear wheel axle turn radius (segment 216), the variable $X_{BC}$ represents the distance between the rear wheel axle 206 and the GNSS receiver 204, and the variable α is vehicle direction angle determined utilizing Equation 5.

Moreover, a controller (e.g., the controller 122 of FIG. 1) utilizes the rear wheel axle turn radius (segment 216) and the distance between the rear wheel axle 206 and the GNSS receiver 204 to determine an example front wheel axle turn radius (segment 218). The front wheel axle turn radius (segment 218) is determined utilizing Equation 7, below.

$$R_A = \sqrt{X_{BA}^2 + R_B^2} \qquad \text{Equation 7}$$

In Equation 7, the variable $R_A$ represents the front wheel axle turn radius (segment 218), the variable $X_{BA}$ represents the distance between the rear wheel axle 206 and the front wheel axle 208 (e.g., the vehicle 202 wheel base), and the variable $R_B$ is rear wheel axle turn radius (segment 216) determined utilizing Equation 6.

In FIG. 2, the vehicle 202 turns about an example center point 220. The center point 220 represents a point in space in which the rear wheel axle turn radius (segment 216) and the front wheel axle turn radius (segment 218) intersect. Depending on a user selected sampling interval, the segment 212 (e.g., the lateral error) is resampled and an example steering angle δ is calculated until the vehicle 202 and, more specifically the GNSS receiver 204, is on the path 210. The steering angle δ is determined utilizing Equation 8, below.

$$\delta = \sin^{-1}\left(\frac{X_{BA}}{R_A}\right)\text{sign}(\alpha) \qquad \text{Equation 8}$$

In Equation 8, the variable $X_{BA}$ represents the distance between the rear wheel axle 206 and the front wheel axle 208 (e.g., the vehicle 202 wheel base), the variable $R_A$ represents the front wheel axle turn radius (segment 218), and the variable $\alpha$ represents the vehicle direction angle determined utilizing Equation 5. In examples disclosed herein the steering angle $\delta$ is calculated to determine the angle in which to steer the front wheel axle 208. Additionally, in examples disclosed herein, the steering angle (e.g., $\delta$) is included in a wheel angle command (e.g., the wheel angle command 123 of FIG. 1). In operation, the GNSS receiver 204 rotates about the center point 220 according to the steering angle $\delta$, thus causing the vehicle direction angle $\alpha$ to be adjusted to cause the path velocity vector 214 to rotate towards the path 210. The steering angle $\delta$ is recalculated and, as such, the vehicle direction angle $\alpha$ is updated until the vehicle 202 reaches the path 210 and the path velocity vector 214 aligns with the path 210.

A controller (e.g., the controller 122 of FIG. 1) calculates the steering angle (e.g., $\delta$) by assuming slippage does not occur with respect to the wheels of the vehicle 202 (e.g., the rear wheel 112 and/or the front wheel 114 of FIG. 1). In such examples, a controller (e.g., the controller 122 of FIG. 1) calculates the steering angle ($\delta$) to cause the path velocity vector 214 associated with the GNSS receiver 204 to point in the same direction as the steering angle $\delta$.

Because the steering angle $\delta$ is calculated and/or otherwise determined at each time interval, the current measured GNSS lateral error position (e.g., segment 212) is utilized as the "initial condition" for that time interval. As such, any vehicle slippage is accounted for which produces a smooth transition to the path 210. In other words, if during a time interval, the vehicle 202 does not achieve the desired point on the path 210 due to slippage, the calculation for the next time interval is based on the actual attained position of the vehicle 202, not the unattained path position. Therefore, the path calculation is updated at each time interval with a new starting position, having any vehicle slippage accounted for.

Figure 3:
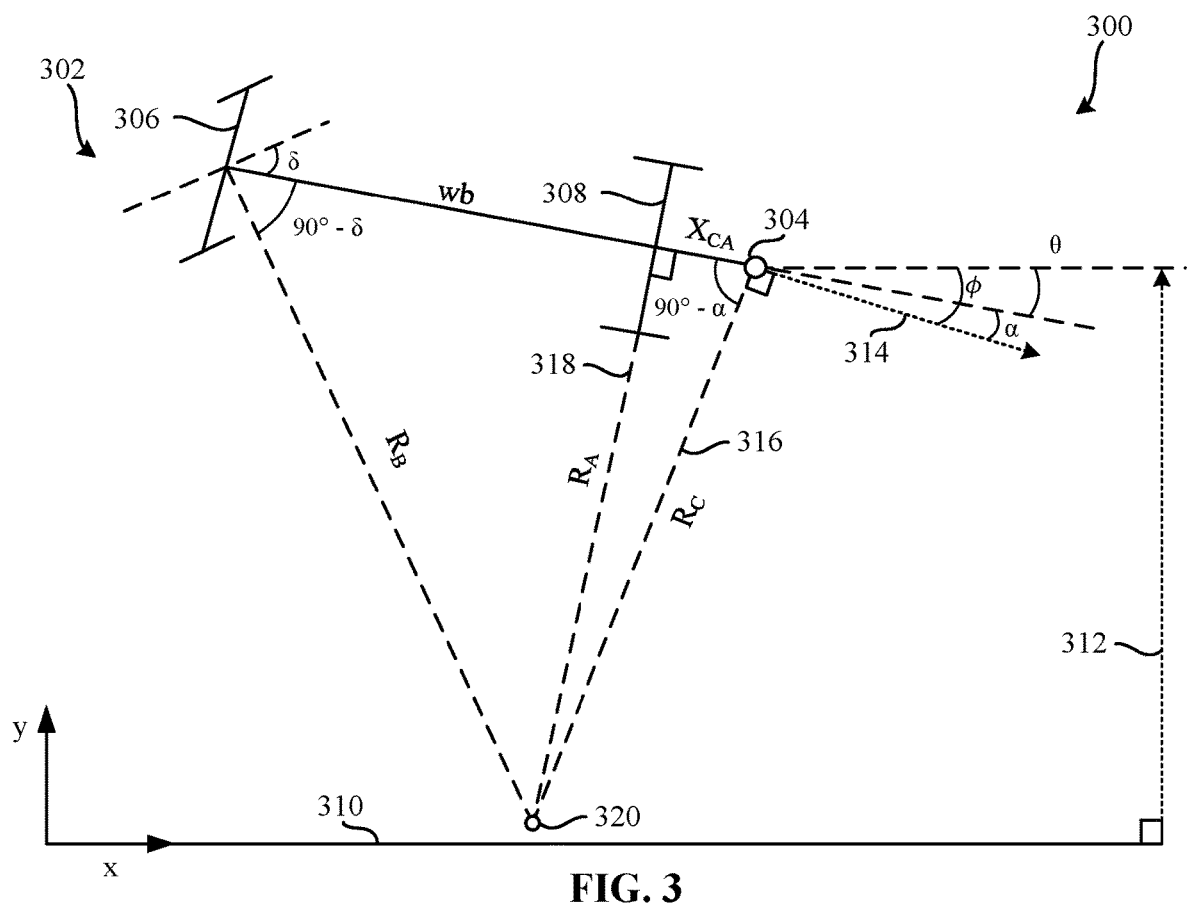
FIG. 3 is a kinematic illustration of a system including an example rear wheel steered vehicle and an example GNSS receiver.

FIG. 3 is a kinematic illustration of a system 300 including an example vehicle 302 and an example GNSS receiver 304. The vehicle 302 is an example vehicle 302 illustrative of a rear steer vehicle (e.g., the vehicle 102 of FIG. 1). The GNSS receiver 304 is an example GNSS receiver 304 illustrative of the GNSS receiver 118 of FIG. 1. In the example of FIG. 3, the example vehicle 302, includes an example rear wheel axle 306 and an example front wheel axle 308. In FIG. 3, the GNSS receiver 304 is located in front of the example front wheel axle 308. Moreover, in FIG. 3, the vehicle 302 is in acquisition mode and, as such an example path 310 represents the desired path to acquire. In examples disclosed herein, the path 310 may be any path, line, outline, tracing, etc., in which the vehicle 302 (or the vehicle 102) is to acquire. For example, the example path 310 is a computer generated line representing a column of agricultural crops that the vehicle 302 is to travel down. In other examples, the path 310 represents a road and/or other thoroughfare along which the vehicle 302 is to travel.

At the initiation of the acquisition mode, a controller (e.g., the controller 122 of FIG. 1) calculates a desired path solution a time interval in the future. Such a desired path solution may be determined utilizing the following equation.

$$\frac{d^2y}{dx_2} + 2(dr)(wn)\left(\frac{dy}{dx}\right) + (wn^2)y = 0 \qquad \text{Equation 9}$$

In Equation 9, the variable y represents the current measured lateral error (segment 312) obtained from the GNSS receiver 304, the variable x represents a distance variable parallel to the path 310 (e.g., the path to acquire) and the path 310, the variable $$\frac{dy}{dx}$$

represents the instantaneous slope of the "desired" path of the vehicle 302 at each time interval, the variable dr represents the damping ratio, and the variable wn represents the natural frequency. A controller (e.g., the controller 122 of FIG. 1) solves Equation 9 for each time interval and, as such, utilizes time steps (e.g., dt) instead of position steps (e.g., dx). Equations 10 and 11 below represent example conversions between time steps (e.g., dt) and position steps (e.g., dx).

$$\frac{dy}{dt} = \left(\frac{dy}{dx}\right)\left(\frac{dx}{dt}\right) \qquad \text{Equation 10}$$

$$\frac{dy}{dx} = \frac{dy/dt}{dx/dt} \qquad \text{Equation 11}$$

For example, the instantaneous slope of the path can be defined as the instantaneous rate of change of lateral error (e.g., the instantaneous rate of change of y). In such an example, the instantaneous rate of change of lateral error is the derivative of the lateral error (segment 312), y, with respect to time $$\left(\text{e.g.,}\ \frac{dy}{dt}\right)$$

divided by the instantaneous rate of change of the path along the x-axis (e.g., the instantaneous rate of change of the variable, x, parallel to the path) with respect to time $$\left(\text{e.g.,}\ \frac{dx}{dt}\right).$$

The instantaneous rate of change of the vehicle 302 along the x-axis (e.g., the instantaneous rate of change of the variable, x, parallel to the path) may be proportional to the path velocity along the x-axis, and the instantaneous rate of change of lateral error (e.g., the instantaneous rate of change of y) may be proportional to the path velocity along the y-axis.

In Equations 9-11, the magnitude of $$\frac{dx}{dt}$$

affects the spacing the calculated points along the x-axis. For example, a small $$\frac{dx}{dt}$$

produces more pain points (finer grid spacing), and a larger $$\frac{dx}{dt}$$

produces fewer points (course grid spacing). In examples disclosed herein, $$\frac{dx}{dt}$$

represents the velocity of the vehicle 302.

In FIG. 3, a controller (e.g., the controller 122 of FIG. 1) determines the vehicle direction angle α utilizing an example path velocity vector angle φ and an example heading error angle θ. The path velocity vector angle φ is determined utilizing Equation 12, below.

$$\phi = -\sin^{-1}\left(\frac{(dy/dt)_0}{U}\right) \quad \text{Equation 12}$$

In Equation 12, the variable $(dy/dt)_0$ represents one time interval solution to Equation 9, and the variable U represents the speed of the vehicle 302. In an example, $(dy/dt)_0$ may be considered the initial condition derived from the solution of Equation 9. The vehicle direction angle α represents the angle between the vehicle 302 and an example path velocity vector 314. In operation, the path velocity vector 314 represents the direction and speed in which the GNSS receiver 304 is traveling. The vehicle direction angle α is determined utilizing Equation 13, below.

$$\alpha = \phi - \theta \quad \text{Equation 13}$$

In Equation 13, the variable φ is the path velocity vector angle determined utilizing Equation 12, and the variable θ represents the heading error angle.

In FIG. 3, a controller (e.g., the controller 122 of FIG. 1) utilizes the distance between the front wheel axle 308 and the GNSS receiver 304, and the vehicle direction angle α, to determine an example GNSS receiver turn radius (segment 316). The GNSS receiver turn radius (segment 316) is determined utilizing Equation 14, below.

$$R_C = \frac{X_{CA}}{\sin|\alpha|} \quad \text{Equation 14}$$

In Equation 14, the variable $R_C$ represents the GNSS receiver turn radius (segment 316), the variable $X_{CA}$ represents the distance between the front wheel axle 308 and the GNSS receiver 304, and the variable α is vehicle direction angle determined utilizing Equation 13.

Moreover, a controller (e.g., the controller 122 of FIG. 1) utilizes the GNSS receiver turn radius (segment 316) and the distance between the front wheel axle 308 and the GNSS receiver 304 to determine an example front wheel axle turn radius (segment 318). The front wheel axle turn radius (segment 318) is determined utilizing Equation 15, below.

$$R_A = R_C^2 - X_{CA}^2 \quad \text{Equation 15}$$

In Equation 15, the variable $R_A$ represents the front wheel axle turn radius (segment 318), the variable $R_C$ is GNSS receiver turn radius (segment 316) determined utilizing Equation 14, and the variable $X_{CA}$ represents the distance between the front wheel axle 308 and the GNSS receiver 304.

In FIG. 3, the vehicle 302 turns about an example center point 320. The center point 320 represents a point in space in which the GNSS receiver turn radius (segment 316) and the front wheel axle turn radius (segment 318) intersect. Depending on a user selected sampling interval, the segment 312 (e.g., the lateral error) is resampled and an example steering angle δ is calculated until the vehicle 302 and, more specifically the GNSS receiver 304, is on the path 310. The steering angle δ is determined utilizing Equation 16, below.

$$\delta = \left(\frac{\pi}{2} - \tan^{-1}\left(\frac{R_A}{wb}\right)\right)\text{sign}(\alpha) \quad \text{Equation 16}$$

In Equation 16, the variable $R_A$ represents the front wheel axle turn radius (segment 318), the variable wb represents the distance between the rear wheel axle 306 and the front wheel axle 308, and the variable α represents the vehicle direction angle determined utilizing Equation 13. In examples disclosed herein the steering angle δ is calculated to determine the angle in which to steer the rear wheel axle 306. In the examples disclosed herein, the steering angle δ is based on at least an inverse tangent operation including the front wheel turn radius and the distance between the rear wheel axle 306 and the front wheel axle 308. Furthermore, the steering angle δ is offset by a constant value (e.g., π/2) associated with half of the range associated with the steering angle. Additionally, in examples disclosed herein, the steering angle (e.g., δ) is included in a wheel angle command (e.g., the wheel angle command 123 of FIG. 1). In operation, the GNSS receiver 304 rotates about the center point 320 according to the steering angle δ, thus causing the vehicle direction angle α to be adjusted to cause the path velocity vector 314 to rotate towards the path 310. The steering angle δ is recalculated and, as such, the vehicle direction angle α is updated until the vehicle 302 reaches the path 310 and the path velocity vector 314 aligns with the path 310.

A controller (e.g., the controller 122 of FIG. 1) calculates the steering angle (e.g., δ) by assuming slippage does not occur with respect to the wheels of the vehicle 302 (e.g., the rear wheel 112 and/or the front wheel 114 of FIG. 1). In such examples, a controller (e.g., the controller 122 of FIG. 1) calculates the steering angle (δ) to cause the path velocity vector 314 associated with the GNSS receiver 304 to point in the same direction as the steering angle δ.

Because the steering angle δ is calculated and/or otherwise determined at each time interval, the current measured GNSS lateral error position (e.g., segment 312) is utilized as the "initial condition" for that time interval. As such, any vehicle slippage is accounted for which produces a smooth transition to the path 310. In other words, if during a time interval, the vehicle 302 does not achieve the desired point on the path 310 due to slippage, the calculation for the next time interval is based on the actual attained position of the vehicle 302, not the unattained path position. Therefore, the path calculation is updated at each time interval with a new starting position, having any vehicle slippage accounted for.

Figure 4:
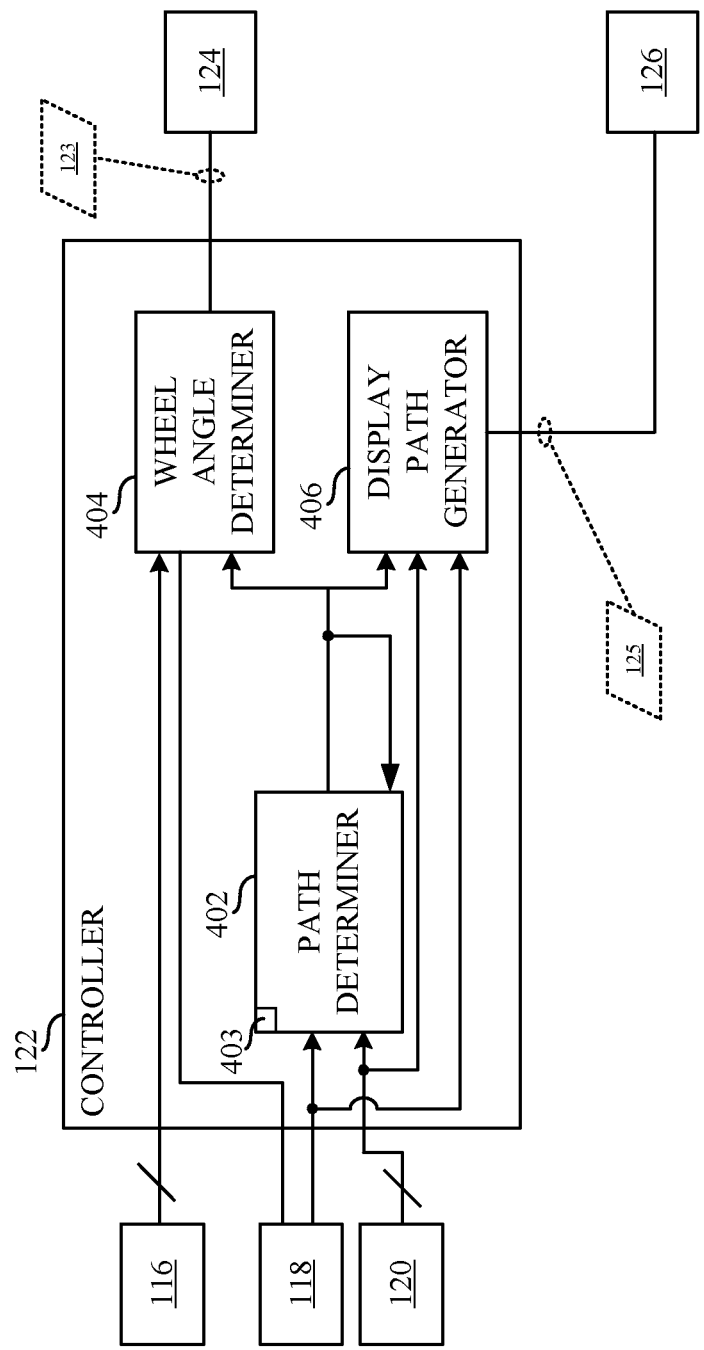
FIG. 4 is a schematic illustration of the controller of FIG. 1 configured to generate the wheel angle command and the path display data of FIG. 1.

FIG. 4 is a schematic illustration of the controller 122 of FIG. 1 configured to generate the wheel angle command 123 and the path display data 125 of FIG. 1. The controller 122 of FIG. 3 is explained below with respect to various elements, angles and/or vectors described in connection with FIGS. 1 and 2. The controller 122 includes an example path determiner 402, an example damping ratio determiner 403, an example wheel angle determiner 404, and an example display path generator 406. In some examples disclosed herein, the controller 122 may include any of the equipment sensor interface 116, the GNSS receiver 118, the path acquisition interface 120, the steering control interface 124, the path interface 126, and/or the tracking mode controller 128 of FIG. 1. In operation, the controller 122 calculates at each sampling interval (e.g., during all GNSS sampling intervals), the wheel angle command 123 to cause the GNSS receiver 118 to follow the projected path.

In the example illustrated in FIG. 4, the path determiner 402 communicates with the GNSS receiver 118 of FIG. 1 to obtain an example lateral error, y, associated with the position of the vehicle 102 of FIG. 1. In examples disclosed herein, the path determiner 402 may be a path determiner controller. Additionally, the path determiner 402 communicates with the path acquisition interface 120 of FIG. 1 to obtain a sampling interval, a damping ratio, dr, and a natural frequency, wn. In examples disclosed herein, the lateral error, y, is provided for each sampling interval determined by the sampling interval obtained from the path acquisition interface 120. The path determiner 402 determines the desired path solution a time interval in the future.

In the example illustrated in FIG. 4, the damping ratio determiner 403 determines whether the damping ratio obtained from the path acquisition interface 120 is greater than, equal to, or less than a damping threshold. In examples disclosed herein, the damping threshold is 1.0. In other examples disclosed herein, the damping threshold may be any suitable threshold (e.g., 0.9, 1.1, etc.). In examples disclosed herein, the path determiner 402 may utilize Equations 1-3 and/or Equations 9-11 set forth above to determine the desired path solution a time interval in the future. The path determiner 402 may utilize and/or otherwise solve Equations 1-3 and/or Equations 9-11 utilizing a first solution method if the damping ratio determiner 403 determines the damping ratio is less than the damping threshold. Alternatively, the path determiner may utilize and/or otherwise solve Equations 1-3 and/or Equations 9-11 utilizing a second solution method if the damping ratio determiner 403 determines the damping ratio is equal to the damping threshold. Likewise, the path determiner 402 may utilize and/or otherwise solve Equations 1-3 and/or Equations 9-11 utilizing a third solution method if the damping ratio determiner 403 determines the damping ratio is greater than the damping threshold. The determined desired path solution a time interval in the future is fed back into the path determiner 402 for use in further calculations. In examples disclosed herein, the path determiner 402 repeatedly solves Equations 1-3 and/or Equations 9-11 for each GNSS time interval to generate a vector of points to be sent to the wheel angle determiner 404 and/or the display path generator 406.

In the example illustrated in FIG. 4, the wheel angle determiner 404 is coupled to the path determiner 402, the display path generator 406, the equipment sensor interface 116 and the GNSS receiver 118. In examples disclosed herein, the wheel angle determiner 404 may be a wheel angle determiner controller. The wheel angle determiner 404 obtains the desired path solution determined by the path determiner 402 (e.g., the solution to Equations 1-3 and/or Equations 9-11). Additionally, the wheel angle determiner 404 obtains an example heading error (e.g., the heading error $\theta$ of FIG. 2 and/or FIG. 3) from the GNSS receiver 118. Moreover, the wheel angle determiner 404 obtains an example velocity (e.g., the velocity U explained in connection with FIG. 2 and/or FIG. 3) and an example offset variable from the equipment sensor interface 116. In examples disclosed herein, the wheel angle determiner 404 determines an example steering angle $\delta$ (e.g., the steering angle $\delta$ of FIG. 2 and/or FIG. 3) to be sent via the wheel angle command 123 to the steering control interface 124. In examples disclosed herein, the wheel angle determiner 404 utilizes Equations 4-8 and/or Equations 12-16 set forth herein to determine the steering angle $\delta$ for the front wheel 114 (e.g., Equations 4-8) and/or the rear wheel 112 (e.g., Equations 12-16) of the vehicle 102 of FIG. 1.

In the example of FIG. 4, the display path generator 406 is coupled to the path determiner 402, to the wheel angle determiner 404, to the GNSS receiver 118, and to the path acquisition interface 120. In some examples disclosed herein, the display path generator 406 may be a display path generator controller. The display path generator 406 obtains the desired path solution a time interval in the future from the path determiner 402. Additionally, the display path generator 406 obtains an example lateral error, y, associated with the position of the vehicle 102 of FIG. 1 from the GNSS receiver 118. Moreover, the display path generator 406 communicates with the path acquisition interface 120 of FIG. 1 to obtain the sampling interval, the damping ratio, dr, and the natural frequency, wn. In examples disclosed herein, the lateral error, y, is provided for each sampling interval determined by the sampling interval obtained from the path acquisition interface 120. The display path generator communicates the path interface 126 to provide the path display data 125. In examples disclosed herein, the display path generator 406 obtains the desired path solution for use in plotting the desired path on the user display 106.

FIG. 5A is an illustration of example code that, when executed by a processor, solves for the desired path solution when the damping ratio is less than a threshold value. Illustrated in FIG. 5A, the threshold value is 1.0 and, as such, the damping ratio is less than 1.0 (e.g., 0.9, 0.4, 0.2, etc.) and, therefore, underdamped. In FIG. 5A, the example line of code (LOC) 1 illustrates initializing the system to the current lateral error. In LOC 1, the variable Yo represents the initial condition and is being defined as the current measured lateral error (LE). LOC 1 may be implemented by the path determiner 402 of FIG. 4. In FIG. 5A, the example lines of code (LOCs) 2-10 illustrate steps utilized by a processor (e.g., the path determiner 402 of FIG. 4) to determine the desired path solution. In the example of FIG. 5A, the variable Ydtp is the desired path solution. LOCs 2-10 may be implemented by the path determiner 402 of FIG. 4. Alternatively, any suitable processor and/or processing system and/or platform may be utilized to execute LOCs 1-10 to determine the desired path solution when the damping ratio is less than the threshold (e.g., 0.9, 0.5, 0.2) and, as such, underdamped. The steps illustrated in LOCs 1-10 are an example mathematical solution to Equations 1-3 and/or Equations 9-11, above. As such, any suitable solution to Equations 1-3 and/or Equations 9-11 above may be utilized (e.g., Euler's Method, substitution, Laplace Transforms, etc.).

FIG. 5B is an illustration of example code that, when executed by a processor, solves for the desired path solution when the damping ratio is a threshold value. Illustrated in FIG. 5B, the threshold value is 1.0 and, as such, the damping ratio is 1.0 and, therefore, critically damped. In FIG. 5B, the example LOC 1 illustrates initializing the system to the current lateral error. In LOC 1, the variable Yo represents the initial condition and is being defined as the current measured LE. LOC 1 may be implemented by the path determiner 402 of FIG. 4. In FIG. 5B, the example LOCs 2-7 illustrate steps utilized by a processor (e.g., the path determiner 402 of FIG. 4) to determine the desired path solution. In the example of FIG. 5B, the variable Ydtp is the desired path solution. LOCs 2-7 may be implemented by the path determiner 402 of FIG. 4. Alternatively, any suitable processor and/or processing system and/or platform may be utilized to execute LOCs 1-7 to determine the desired path solution when the damping ratio is equal to the threshold (e.g., 1.0) and, as such, critically damped. The steps illustrated in LOCs 1-7 are an example mathematical solution to Equations 1-3 and/or Equations 9-11, above. As such, any suitable solution to Equations 1-3 and/or Equations 9-11 above may be utilized (e.g., Euler's Method, substitution, Laplace Transforms, etc.).

FIG. 5C is an illustration of example code that, when executed by a processor, solves for the desired path solution when the damping ratio is greater than a threshold value. Illustrated in FIG. 5C, the threshold value is 1.0 and, as such, the damping ratio is greater than the threshold (e.g., 1.2, 1.4, 1.6, etc.,) and, therefore, over damped. In FIG. 5C, the example LOC 1 illustrates initializing the system to the current lateral error. In LOC 1, the variable Yo represents the initial condition and is being defined as the current measured LE. LOC 1 may be implemented by the path determiner 402 of FIG. 4. In FIG. 5C, the example LOCs 2-9 illustrate steps utilized by a processor (e.g., the path determiner 402 of FIG. 4) to determine the desired path solution. In the example of FIG. 5C, the variable Ydtp is the desired path solution. LOCs 2-9 may be implemented by the path determiner 402 of FIG. 4. Alternatively, any suitable processor and/or processing system and/or platform may be utilized to execute LOCs 1-9 to determine the desired path solution when the damping ratio is greater than the threshold (e.g., 1.2, 1.4, 1.6, etc.,) and, as such, over damped. The steps illustrated in LOCs 1-9 are an example mathematical solution to Equations 1-3 and/or Equations 9-11, above. As such, any suitable solution to Equations 1-3 and/or Equations 9-11 above may be utilized (e.g., Euler's Method, substitution, Laplace Transforms, etc.).

Figure 6:
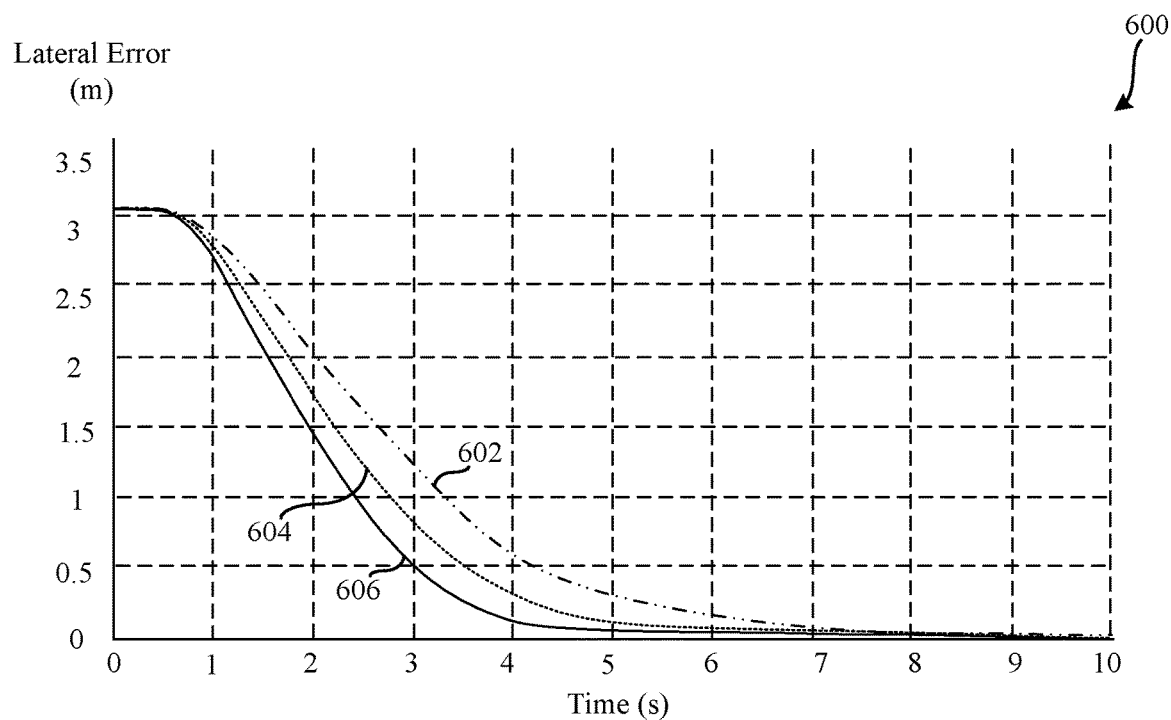
FIG. 6 is a graphical illustration depicting lateral error of a front wheel steered vehicle versus time for varying natural frequencies.

FIG. 6 is a graphical illustration 600 depicting lateral error versus time for varying natural frequencies. The graphical illustration 600 of FIG. 6 includes an example first simulation plot (line 602), an example second simulation plot (line 604), and an example third simulation plot (line 606). In the example of FIG. 6, the first simulation plot (line 602) represents the lateral error of a front steer vehicle (e.g., the vehicle 102) versus time when the user selects aggressiveness variables including a damping ratio of 1.0 and a natural frequency of 0.8. Additionally, in the example of FIG. 6, the second simulation plot (line 604) represents the lateral error of a front steer vehicle (e.g., vehicle 102) versus time when the user selects aggressiveness variables including a damping ratio of 1.0 and a natural frequency of 1.0. Moreover, in the example of FIG. 6, the third simulation plot (line 606) represents the lateral error of a front steer vehicle (e.g., vehicle 102) versus time when the user selects aggressiveness variables including a damping ratio of 1.0 and a natural frequency of 1.2. In FIG. 6, a lateral error of 0 meters (e.g., the x-axis) represents the desired path to be acquired.

In the example first simulation plot (line 602), the front steer vehicle (e.g., vehicle 102) starts at time zero with a lateral error of 3.048 meters (e.g., 10 feet). The first simulation plot (line 602) illustrates a critically damped nature and reaches the desired path (e.g., a lateral error of 0 meters) around 8 seconds. In the example second simulation plot (line 604), the front steer vehicle (e.g., vehicle 102) starts at time zero with a lateral error of 3.048 meters (e.g., 10 feet). The second simulation plot (line 604) illustrates a critically damped nature and is more aggressive than the first simulation plot (line 602). For example, because the natural frequency selected in the second simulation plot (line 604) is greater than the natural frequency selected in the first simulation plot (line 602), the slope of the path in which the vehicle travels to reach the desired path (e.g., a lateral error of 0 meters) is steeper. As such, in the second simulation plot (line 604), the vehicle reaches the desired path (e.g., a lateral error of 0 meters) in about 6 seconds. In the example third simulation plot (line 606), the front steer vehicle (e.g., vehicle 102) starts at time zero with a lateral error of 3.048 meters (e.g., 10 feet). The third simulation plot (line 606) illustrates a critically damped nature and is more aggressive than the first simulation plot (line 602) and the second simulation plot (line 604). For example, because the natural frequency selected in the third simulation plot (line 606) is greater than the natural frequency selected in the first simulation plot (line 602) and the natural frequency selected in the second simulation plot (line 604), the slope of the path in which the vehicle travels to reach the desired path (e.g., a lateral error of 0 meters) is steeper. As such, in the third simulation plot (line 606), the vehicle reaches the desired path (e.g., a lateral error of 0 meters) in about 4.5 seconds.

In some examples disclosed herein, any of the first simulation plot (line 602), the second simulation plot (line 604), and/or the third simulation plot (line 606) may be displayed on the user display 106 of FIG. 1 via the path interface 126 of FIG. 1 and/or the display path generator 406 of FIG. 4. In the graphical illustration of FIG. 6, the damping ratio is 1 and, therefore, the front steer vehicle (e.g., vehicle 102) reaches the desired path (e.g., a lateral error of 0 meters) without overshooting the desired path (e.g., a lateral error of 0 meters).

Figure 7:
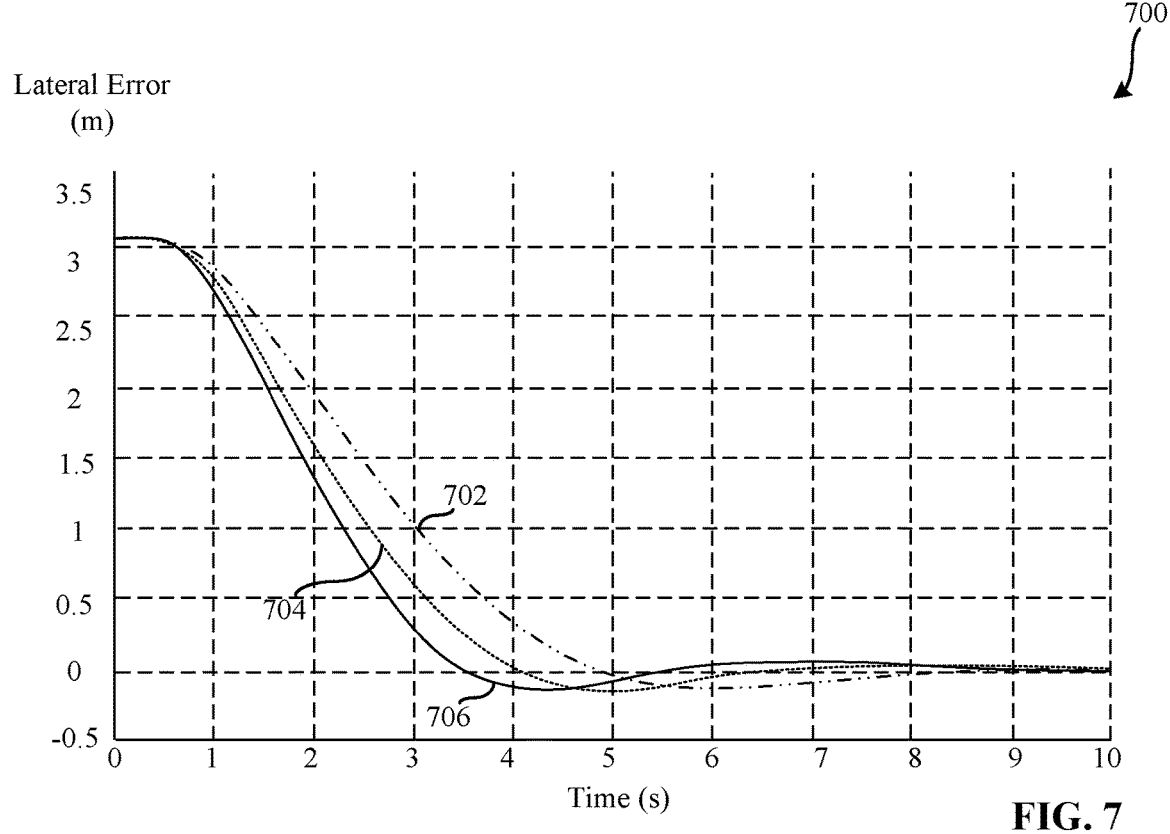
FIG. 7 is a graphical illustration depicting lateral error of a front wheel steered vehicle versus time for varying natural frequencies at an alternative damping ratio as in FIG. 6.

FIG. 7 is a graphical illustration 700 depicting lateral error versus time for varying natural frequencies at an alternative damping ratio as in FIG. 6. The graphical illustration 700 of FIG. 7 includes an example first simulation plot (line 702), an example second simulation plot (line 704), and an example third simulation plot (line 706). In the example of FIG. 7, the first simulation plot (line 702) represents the lateral error of the front steer vehicle (e.g., vehicle 102) versus time when the user selects aggressiveness variables including a damping ratio of 0.8 and a natural frequency of 0.8. Additionally, in the example of FIG. 7, the second simulation plot (line 704) represents the lateral error of the front steer vehicle (e.g., vehicle 102) versus time when the user selects aggressiveness variables including a damping ratio of 0.8 and a natural frequency of 1.0. Moreover, in the example of FIG. 7, the third simulation plot (line 706) represents the lateral error of the front steer vehicle (e.g., vehicle 102) versus time when the user selects aggressiveness variables including a damping ratio of 0.8 and a natural frequency of 1.2. In FIG. 7, a lateral error of 0 meters represents the desired path to be acquired.

In the example first simulation plot (line 702), the front steer vehicle (e.g., vehicle 102) starts at time zero with a lateral error of 3.048 meters (e.g., 10 feet). The first simulation plot (line 702) illustrates an underdamped nature and reaches the desired path (e.g., a lateral error of 0 meters) around 9 seconds. Illustrated in the first simulation plot (line 702), the front steer vehicle (e.g., vehicle 102) overshoots the desired path (e.g., a lateral error of 0 meters). In such an example, the overshoot may be desirable to position the tractor on the desired path (e.g., potion a drawbar or implement on the desired path). In the example second simulation plot (line 704), the front steer vehicle (e.g., vehicle 102) starts at time zero with a lateral error of 3.048 meters (e.g., 10 feet). The second simulation plot (line 704) illustrates an underdamped nature and is more aggressive than the first simulation plot (line 702). For example, because the natural frequency selected in the second simulation plot (line 704) is greater than the natural frequency selected in the first simulation plot (line 702), the slope of the path in which the vehicle travels to reach the desired path (e.g., a lateral error of 0 meters) is steeper. As such, in the second simulation plot (line 704), the vehicle reaches the desired path (e.g., a lateral error of 0 meters) in about 8.5 seconds. Illustrated in the second simulation plot (line 704), the front steer vehicle (e.g., vehicle 102) overshoots the desired path (e.g., a lateral error of 0 meters). In such an example, the overshoot may be desirable to position the tractor on the desired path (e.g., potion a drawbar or implement on the desired path). In the example third simulation plot (line 706), the front steer vehicle (e.g., vehicle 102) starts at time zero with a lateral error of 3.048 meters (e.g., 10 feet). The third simulation plot (line 706) illustrates an underdamped nature and is more aggressive than the first simulation plot (line 702) and the second simulation plot (line 704). For example, because the natural frequency selected in the third simulation plot (line 706) is greater than the natural frequency selected in the first simulation plot (line 702) and the natural frequency selected in the second simulation plot (line 704), the slope of the path in which the vehicle travels to reach the desired path (e.g., a lateral error of 0 meters) is steeper. As such, in the third simulation plot (line 706), the vehicle reaches the desired path (e.g., a lateral error of 0 meters) in about 8 seconds. Illustrated in the third simulation plot (line 706), the front steer vehicle (e.g., vehicle 102) overshoots the desired path (e.g., a lateral error of 0 meters). In such an example, the overshoot may be desirable to position the tractor on the desired path (e.g., potion a drawbar or implement on the desired path).

In some examples disclosed herein, any of the first simulation plot (line 702), the second simulation plot (line 704), and/or the third simulation plot (line 706) may be displayed on the user display 106 of FIG. 1 via the path interface 126 of FIG. 1 and/or the display path generator 406 of FIG. 4. In the graphical illustration of FIG. 7, the damping ratio is 0.8 and, therefore, the front steer vehicle (e.g., vehicle 102) reaches the desired path (e.g., a lateral error of 0 meters) by overshooting the desired path (e.g., a lateral error of 0 meters).

Figure 8:
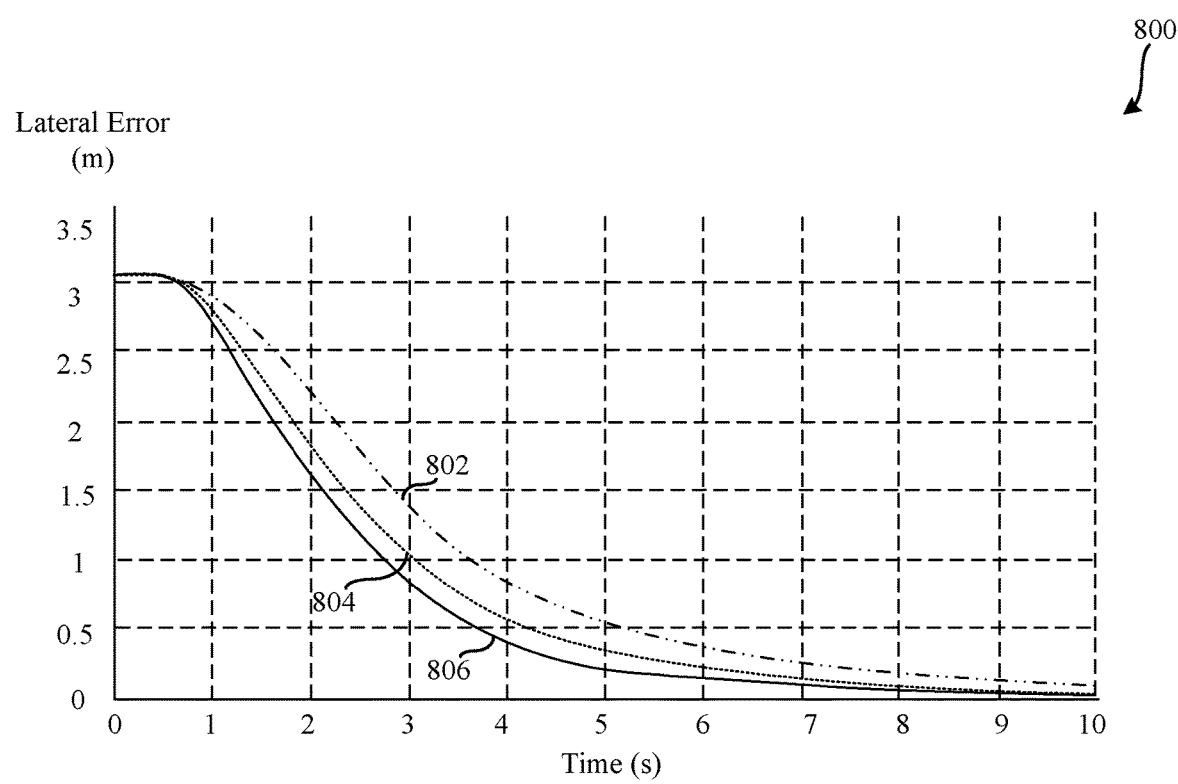
FIG. 8 is a graphical illustration depicting lateral error of a front wheel steered vehicle versus time for different natural frequencies at an alternative damping ratio as in FIGS. 6 and 7.

FIG. 8 is a graphical illustration 800 depicting lateral error versus time for different natural frequencies at an alternative damping ratio as in FIGS. 6 and 7. The graphical illustration 800 of FIG. 8 includes an example first simulation plot (line 802), an example second simulation plot (line 804), and an example third simulation plot (line 806). In the example of FIG. 8, the first simulation plot (line 802) represents the lateral error of the front steer vehicle (e.g., vehicle 102) versus time when the user selects aggressiveness variables including a damping ratio of 1.2 and a natural frequency of 0.8. Additionally, in the example of FIG. 8, the second simulation plot (line 804) represents the lateral error of the front steer vehicle (e.g., vehicle 102) versus time when the user selects aggressiveness variables including a damping ratio of 1.2 and a natural frequency of 1.0. Moreover, in the example of FIG. 8, the third simulation plot (line 806) represents the lateral error of the front steer vehicle (e.g., vehicle 102) versus time when the user selects aggressiveness variables including a damping ratio of 1.2 and a natural frequency of 1.2. In FIG. 8, a lateral error of 0 meters represents the desired path to be acquired.

In the example first simulation plot (line 802), the front steer vehicle (e.g., vehicle 102) starts at time zero with a lateral error of 3.048 meters (e.g., 10 feet). The first simulation plot (line 802) illustrates an overdamped nature and reaches the desired path (e.g., a lateral error of 0 meters) around 10 seconds. In the example second simulation plot (line 804), the front steer vehicle (e.g., vehicle 102) starts at time zero with a lateral error of 3.048 meters (e.g., 10 feet). The second simulation plot (line 804) illustrates an overdamped nature and is more aggressive than the first simulation plot (line 802). For example, because the natural frequency selected in the second simulation plot (line 804) is greater than the natural frequency selected in the first simulation plot (line 802), the slope of the path in which the vehicle travels to reach the desired path (e.g., a lateral error of 0 meters) is steeper. As such, in the second simulation plot (line 804), the vehicle reaches the desired path (e.g., a lateral error of 0 meters) in about 9 seconds. In the example third simulation plot (line 806), the front steer vehicle (e.g., vehicle 102) starts at time zero with a lateral error of 3.048 meters (e.g., 10 feet). The third simulation plot (line 806) illustrates an overdamped nature and is more aggressive than the first simulation plot (line 802) and the second simulation plot (line 804). For example, because the natural frequency selected in the third simulation plot (line 806) is greater than the natural frequency selected in the first simulation plot (line 802) and the natural frequency selected in the second simulation plot (line 804), the slope of the path in which the vehicle travels to reach the desired path (e.g., a lateral error of 0 meters) is steeper. As such, in the third simulation plot (line 806), the vehicle reaches the desired path (e.g., a lateral error of 0 meters) in about 8 seconds.

In some examples disclosed herein, any of the first simulation plot (line 802), the second simulation plot (line 804), and/or the third simulation plot (line 806) may be displayed on the user display 106 of FIG. 1 via the path interface 126 of FIG. 1 and/or the display path generator 406 of FIG. 4. In the graphical illustration of FIG. 8, the damping ratio is 1.2 and, therefore, the front steer vehicle (e.g., vehicle 102) reaches the desired path (e.g., a lateral error of 0 meters) without overshooting the desired path (e.g., a lateral error of 0 meters).

Figure 9:
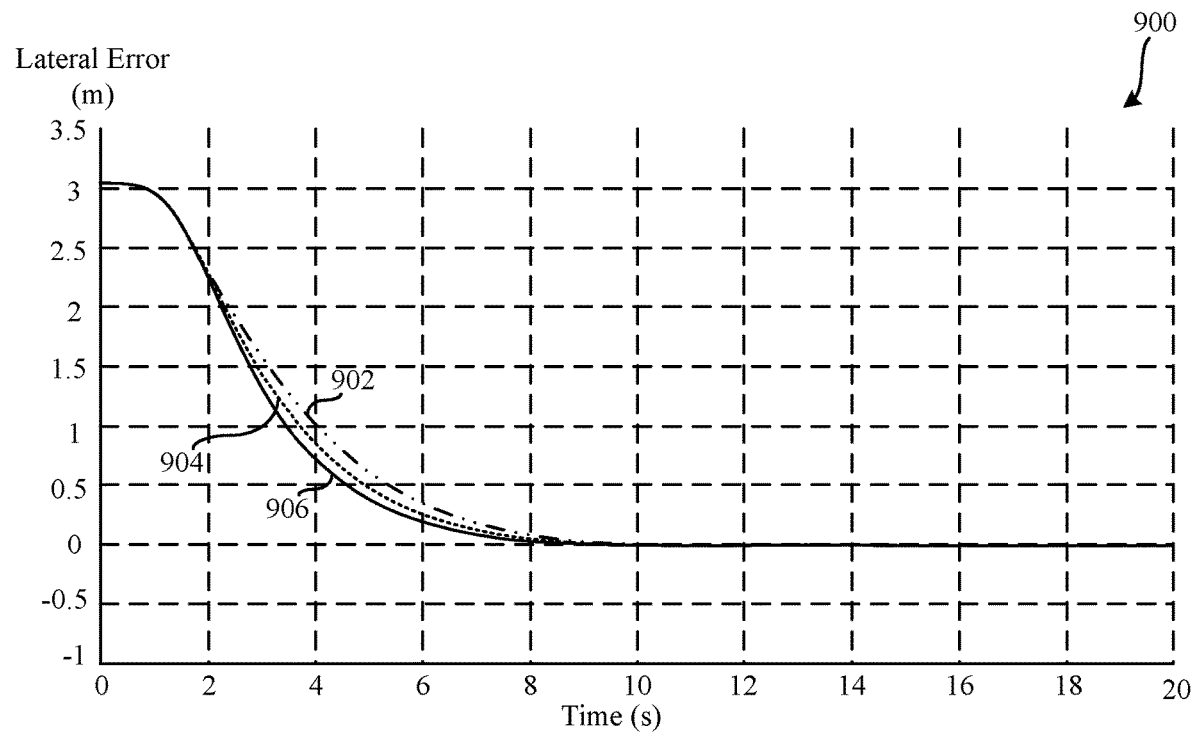
FIG. 9 is a graphical illustration depicting lateral error versus of a rear wheel steered vehicle time for varying natural frequencies.

FIG. 9 is a graphical illustration 900 depicting lateral error versus time for varying natural frequencies. The graphical illustration 900 of FIG. 9 includes an example first simulation plot (line 902), an example second simulation plot (line 904), and an example third simulation plot (line 906). In the example of FIG. 9, the first simulation plot (line 902) represents the lateral error of a rear steer vehicle (e.g., vehicle 102) versus time when the user selects aggressiveness variables including a damping ratio of 2.0 and a natural frequency of 1.6. Additionally, in the example of FIG. 9, the second simulation plot (line 904) represents the lateral error of the rear steer vehicle (e.g., vehicle 102) versus time when the user selects aggressiveness variables including a damping ratio of 2.0 and a natural frequency of 1.8. Moreover, in the example of FIG. 9, the third simulation plot (line 906) represents the lateral error of the rear steer vehicle (e.g., vehicle 102) versus time when the user selects aggressiveness variables including a damping ratio of 2.0 and a natural frequency of 1.9. In FIG. 9, a lateral error of 0 meters (e.g., the x-axis) represents the desired path to be acquired. In the example of FIG. 9, the first simulation plot (line 902), the second simulation plot (line 904), and the third simulation plot (line 906) represent simulations for a cotton-picking vehicle (e.g., the vehicle 102) as it acquires a desired path.

In the example first simulation plot (line 902), the rear steer vehicle (e.g., vehicle 102) starts at time zero with a lateral error of 3.048 meters (e.g., 10 feet). The first simulation plot (line 902) illustrates an overdamped operation and reaches the desired path (e.g., a lateral error of 0 meters) around 10 seconds. In the example second simulation plot (line 904), the vehicle 102 starts at time zero with a lateral error of 3.048 meters (e.g., 10 feet). The second simulation plot (line 904) illustrates an overdamped operation and is more aggressive than the first simulation plot (line 902). For example, because the natural frequency selected in the second simulation plot (line 904) is greater than the natural frequency selected in the first simulation plot (line 902), the slope of the path in which the vehicle travels to reach the desired path (e.g., a lateral error of 0 meters) is steeper than that of the first simulation plot (line 902). As such, in the second simulation plot (line 904), the vehicle reaches the desired path (e.g., a lateral error of 0 meters) around 9.5 seconds. In the example third simulation plot (line 906), the rear steer vehicle (e.g., vehicle 102) starts at time zero with a lateral error of 3.048 meters (e.g., 10 feet). The third simulation plot (line 906) illustrates an overdamped operation and is more aggressive than the first simulation plot (line 902) and the second simulation plot (line 904). For example, because the natural frequency selected in the third simulation plot (line 906) is greater than the natural frequency selected in the first simulation plot (line 902) and the natural frequency selected in the second simulation plot (line 904), the slope of the path in which the vehicle travels to reach the desired path (e.g., a lateral error of 0 meters) is more steep than that of the first simulation plot (line 902) and the second simulation plot (line 904). As such, in the third simulation plot (line 906), the vehicle reaches the desired path (e.g., a lateral error of 0 meters) around 9 seconds.

In some examples disclosed herein, any of the first simulation plot (line 902), the second simulation plot (line 904), and/or the third simulation plot (line 906) may be displayed on the user display 106 of FIG. 1 via the path interface 126 of FIG. 1 and/or the display path generator 406 of FIG. 4. In the graphical illustration of FIG. 9, the damping ratio is 2 and, therefore, the rear steer vehicle (e.g., vehicle 102) reaches the desired path (e.g., a lateral error of 0 meters) without overshooting the desired path (e.g., a lateral error of 0 meters).

Figure 10:
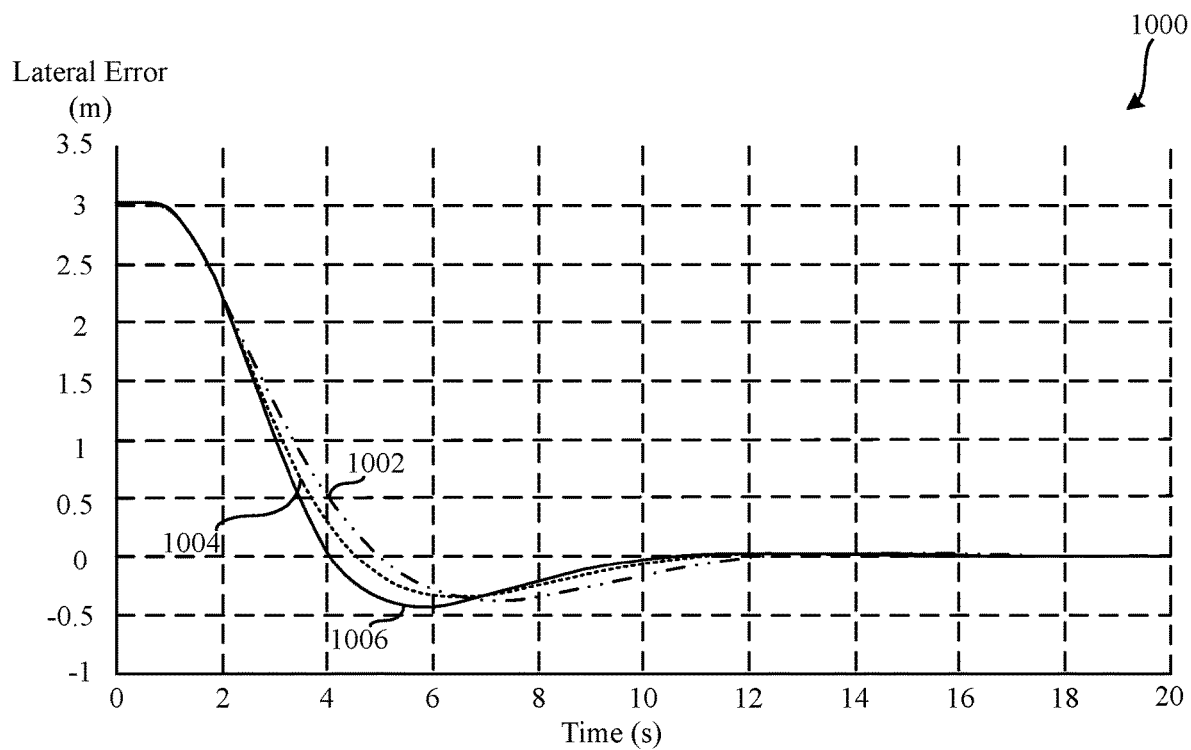
FIG. 10 is a graphical illustration depicting lateral error of a rear wheel steered vehicle versus time for varying natural frequencies at an alternative damping ratio as in FIG. 9.

FIG. 10 is a graphical illustration 1000 depicting lateral error versus time for varying natural frequencies at an alternative damping ratio as in FIG. 9. The graphical illustration 1000 of FIG. 10 includes an example first simulation plot (line 1002), an example second simulation plot (line 1004), and an example third simulation plot (line 1006). In the example of FIG. 10, the first simulation plot (line 1002) represents the lateral error of the rear steer vehicle (e.g., vehicle 102) versus time when the user selects aggressiveness variables including a damping ratio of 1.0 and a natural frequency of 1.6. Additionally, in the example of FIG. 10, the second simulation plot (line 1004) represents the lateral error of the rear steer vehicle (e.g., vehicle 102) versus time when the user selects aggressiveness variables including a damping ratio of 1.0 and a natural frequency of 1.8. Moreover, in the example of FIG. 10, the third simulation plot (line 1006) represents the lateral error of the rear steer vehicle (e.g., vehicle 102) versus time when the user selects aggressiveness variables including a damping ratio of 1.0 and a natural frequency of 1.9. In FIG. 10, a lateral error of 0 meters represents the desired path to be acquired. In the example of FIG. 10, the first simulation plot (line 1002), the second simulation plot (line 1004), and the third simulation plot (line 1006) represent simulations for a cotton-picking vehicle (e.g., the vehicle 102) as it acquires a desired path. than that of the first simulation plot (line 1002) and the second simulation plot (line 1004).

In the example first simulation plot (line 1002), the rear steer vehicle (e.g., vehicle 102) starts at time zero with a lateral error of 3.048 meters (e.g., 10 feet). The first simulation plot (line 1002) illustrates a critically damped operation and reaches the desired path (e.g., a lateral error of 0 meters) around 5 seconds. Illustrated in the first simulation plot (line 1002), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path). In the example second simulation plot (line 1004), the rear steer vehicle (e.g., vehicle 102) starts at time zero with a lateral error of 3.048 meters (e.g., 10 feet). The second simulation plot (line 1004) illustrates a critically damped operation and is more aggressive than the first simulation plot (line 1002). For example, because the natural frequency selected in the second simulation plot (line 1004) is greater than the natural frequency selected in the first simulation plot (line 1002), the slope of the path in which the rear steer vehicle (e.g., vehicle 102) travels to reach the desired path (e.g., a lateral error of 0 meters) is steeper than that of the first simulation plot (line 1002). As such, in the second simulation plot (line 1004), the vehicle reaches the desired path (e.g., a lateral error of 0 meters) in about 4.5 seconds. Illustrated in the second simulation plot (line 1004), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path). In the example third simulation plot (line 1006), the rear steer vehicle (e.g., vehicle 102) starts at time zero with a lateral error of 3.048 meters (e.g., 10 feet). The third simulation plot (line 1006) illustrates a critically damped operation and is more aggressive than the first simulation plot (line 1002) and the second simulation plot (line 1004). For example, because the natural frequency selected in the third simulation plot (line 1006) is greater than the natural frequency selected in the first simulation plot (line 1002) and the natural frequency selected in the second simulation plot (line 1004), the slope of the path in which the rear steer vehicle (e.g., vehicle 102) travels to reach the desired path (e.g., a lateral error of 0 meters) is steeper than that of the first simulation plot (line 1002) and the second simulation plot (line 1004). As such, in the third simulation plot (line 1006), the vehicle reaches the desired path (e.g., a lateral error of 0 meters) in about 4 seconds. Illustrated in the third simulation plot (line 1006), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path).

In some examples disclosed herein, any of the first simulation plot (line 1002), the second simulation plot (line 1004), and/or the third simulation plot (line 1006) may be displayed on the user display 106 of FIG. 1 via the path interface 126 of FIG. 1 and/or the display path generator 406 of FIG. 4. In the graphical illustration of FIG. 10, the damping ratio is 1.0 and, therefore, the rear steer vehicle (e.g., vehicle 102) reaches the desired path (e.g., a lateral error of 0 meters) by overshooting the desired path (e.g., a lateral error of 0 meters).

Figure 11:
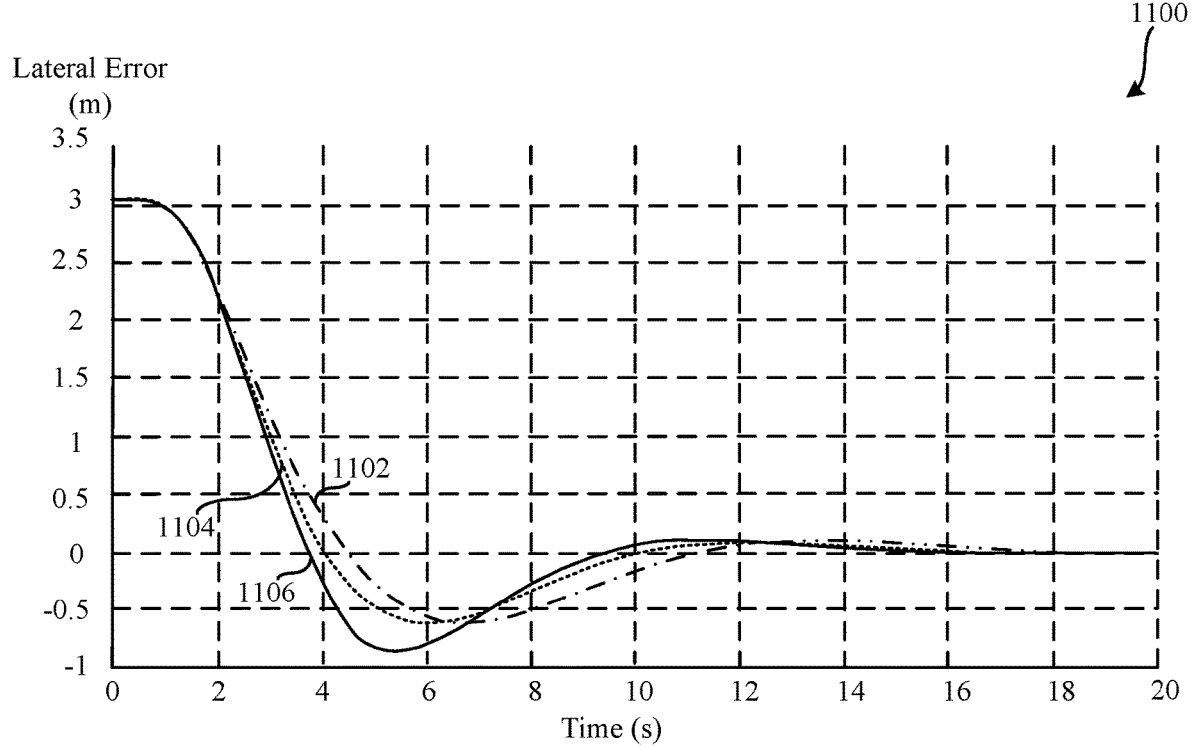
FIG. 11 is a graphical illustration depicting lateral error of a rear wheel steered vehicle versus time for different natural frequencies at an alternative damping ratio as in FIGS. 9 and 10.

FIG. 11 is a graphical illustration 1100 depicting lateral error versus time for different natural frequencies at an alternative damping ratio as in FIGS. 9 and 10. The graphical illustration 1100 of FIG. 11 includes an example first simulation plot (line 1102), an example second simulation plot (line 1104), and an example third simulation plot (line 1106). In the example of FIG. 11, the first simulation plot (line 1102) represents the lateral error of the rear steer vehicle (e.g., vehicle 102) versus time when the user selects aggressiveness variables including a damping ratio of 0.7 and a natural frequency of 1.6. Additionally, in the example of FIG. 11, the second simulation plot (line 1104) represents the lateral error of the rear steer vehicle (e.g., vehicle 102) versus time when the user selects aggressiveness variables including a damping ratio of 0.7 and a natural frequency of 1.8. Moreover, in the example of FIG. 11, the third simulation plot (line 1106) represents the lateral error of the rear steer vehicle (e.g., vehicle 102) versus time when the user selects aggressiveness variables including a damping ratio of 0.7 and a natural frequency of 1.9. In FIG. 11, a lateral error of 0 meters represents the desired path to be acquired. In the example of FIG. 11, the first simulation plot (line 1102), the second simulation plot (line 1104), and the third simulation plot (line 1106) represent simulations for a cotton-picking vehicle (e.g., the vehicle 102) as it acquires a desired path.

In the example first simulation plot (line 1102), the rear steer vehicle (e.g., vehicle 102) starts at time zero with a lateral error of 3.048 meters (e.g., 10 feet). The first simulation plot (line 1102) illustrates an underdamped operation and reaches the desired path (e.g., a lateral error of 0 meters) around 4.5 seconds. Illustrated in the first simulation plot (line 1102), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path). In the example second simulation plot (line 1104), the rear steer vehicle (e.g., vehicle 102) starts at time zero with a lateral error of 3.048 meters (e.g., 10 feet). The second simulation plot (line 1104) illustrates an underdamped operation and is more aggressive than the first simulation plot (line 1102). For example, because the natural frequency selected in the second simulation plot (line 1104) is greater than the natural frequency selected in the first simulation plot (line 1102), the slope of the path in which the rear steer vehicle (e.g., vehicle 102) travels to reach the desired path (e.g., a lateral error of 0 meters) is steeper than that of the first simulation plot (line 1102). As such, in the second simulation plot (line 1104), the vehicle reaches the desired path (e.g., a lateral error of 0 meters) in about 4 seconds. Illustrated in the second simulation plot (line 1104), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path). In the example third simulation plot (line 1106), the rear steer vehicle (e.g., vehicle 102) starts at time zero with a lateral error of 3.048 meters (e.g., 10 feet). The third simulation plot (line 1106) illustrates an underdamped operation and is more aggressive than the first simulation plot (line 1102) and the second simulation plot (line 1104). For example, because the natural frequency selected in the third simulation plot (line 1106) is greater than the natural frequency selected in the first simulation plot (line 1102) and the natural frequency selected in the second simulation plot (line 1104), the slope of the path in which the rear steer vehicle (e.g., vehicle 102) travels to reach the desired path (e.g., a lateral error of 0 meters) is steeper than that of the first simulation plot (line 1102) and the second simulation plot (line 1104). As such, in the third simulation plot (line 1106), the rear steer vehicle (e.g., vehicle 102) reaches the desired path (e.g., a lateral error of 0 meters) in about 3.5 seconds. Illustrated in the third simulation plot (line 1106), the rear steer vehicle (e.g., vehicle 102) overshoots the desired path (e.g., a lateral error of 0 meters). In such an example, the overshoot may be desirable to position the rear steer vehicle (e.g., vehicle 102) on the desired path (e.g., potion a drawbar or implement on the desired path). The overshoot as described with respect to FIG. 11 is greater than the overshoot as described with respect to FIG. 10. For example, because the damping ratio is less in the example of FIG. 11 than the damping ration in the example of FIG. 10, the example overshoot as described with respect to FIG. 11 is greater than the overshoot as described with respect to FIG. 10.

In some examples disclosed herein, any of the first simulation plot (line 1102), the second simulation plot (line 1104), and/or the third simulation plot (line 1106) may be displayed on the user display 106 of FIG. 1 via the path interface 126 of FIG. 1 and/or the display path generator 406 of FIG. 4. In the graphical illustration of FIG. 11, the damping ratio is 0.7 and, therefore, the rear steer vehicle (e.g., vehicle 102) reaches the desired path (e.g., a lateral error of 0 meters) by overshooting the desired path (e.g., a lateral error of 0 meters).

While an example manner of implementing the vehicle control network 104a and/or the vehicle control network 104b of FIG. 1 is illustrated in FIG. 4, one or more of the elements, processes and/or devices illustrated in FIG. 4 may be combined, divided, re-arranged, omitted, eliminated and/or implemented in any other way. Further, the example equipment sensor interface 116, the example GNSS receiver 118, the example path acquisition interface 120, the example controller 122, the example steering control interface 124, the example path interface 126, the tracking mode controller 128, the example path determiner 402, the example wheel angle determiner 404, the example display path generator 406, and/or, more generally, the example vehicle control network 104a and/or the vehicle control network 104b of FIG. 1 may be implemented by hardware, software, firmware and/or any combination of hardware, software and/or firmware. Thus, for example, any of the example equipment sensor interface 116, the example GNSS receiver 118, the example path acquisition interface 120, the example controller 122, the example steering control interface 124, the example path interface 126, the tracking mode controller 128, the example path determiner 402, the example wheel angle determiner 404, the example display path generator 406, and/or, more generally, the example vehicle control network 104a and/or the vehicle control network 104b of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example equipment sensor interface 116, the example GNSS receiver 118, the example path acquisition interface 120, the example controller 122, the front steering control interface 124, the example path interface 126, the tracking mode controller 128, the example path determiner 402, the example wheel angle determiner 404, and/or the example display path generator 406 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle control network 104a and/or the vehicle control network 104b of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the vehicle control network 104a and/or the vehicle control network 104b of FIG. 1 are shown in FIGS. 12-15. The machine readable instructions may be one or more executable programs or portion(s) of an executable program for execution by a computer processor such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIG. 12-15, many other methods of implementing the example vehicle control network 104a and/or the vehicle control network 104b of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 12-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 12:
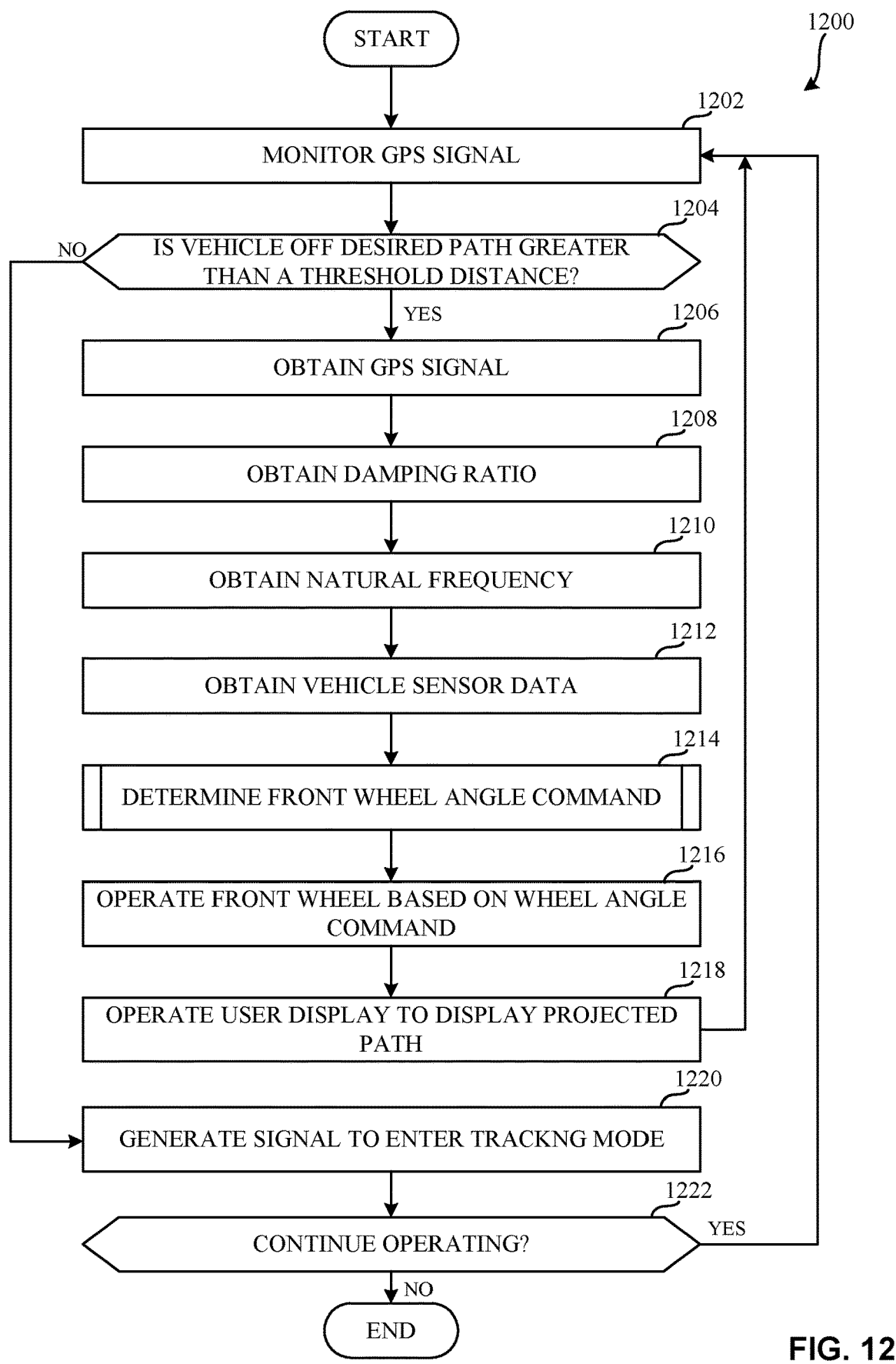
FIG. 12 is a flowchart representative of machine readable instructions that may be executed to implement the example vehicle control network of FIG. 1 to control the steering of a front steering vehicle.

FIG. 12 is a flowchart representative of machine readable instructions 1200 that may be executed to implement the example vehicle control network 104a and/or the example vehicle control network 104b of FIG. 1 to control the steering of a front steering vehicle (e.g., the vehicle 102 of FIG. 1). In the example instructions 1200 illustrated in FIG. 12, the GNSS receiver 118 monitors a GNSS signal of the front steering vehicle (e.g., the vehicle 102 of FIG. 1) (block 1202). For example, the GNSS receiver 118 monitors a GNSS signal representative of the location of the GNSS receiver 118. Moreover, the path determiner 402 determines whether the vehicle is off the desired path greater than (e.g., more than) a desired threshold distance (block 1204). In response to the control executed in block 1204 returning NO, then control proceeds to block 1220 to enter tracking mode. Alternatively, in response to the control executed in block 1204 returning YES, then the example path determiner 402 of the controller 122 obtains and/or otherwise receives the GNSS signal from the GNSS receiver 118 (block 1206). In examples disclosed herein, the GNSS signal includes a lateral error indication representative of the distance between the GNSS receiver 118 and the desired path.

The path acquisition interface 120 then obtains the damping ratio (block 1208). For example, the path acquisition interface 120 communicates with the user display 106 to determine the damping ratio provided and/or otherwise set by a user. In addition, the path acquisition interface 120 obtains the natural frequency (block 1210). For example, the path acquisition interface 120 communicates with the user display 106 to determine the natural frequency provide and/or otherwise set by a user.

In response, equipment sensor interface 116 obtains vehicle sensor data (block 1212). For example, the equipment sensor interface 116 may obtain data indicating the velocity of the vehicle and/or any suitable vehicle 102 sensor data. In response to the control of block 1212, the controller 122 determines the wheel angle command 123 (block 1214). The control executed by the controller 122 to determine the wheel angle command 123 is explained in further detail hereinbelow in connection with FIG. 13.

The controller 122 communicates with the steering control interface 124 the wheel angle command 123 to operate the front wheel 114 (block 1216). For example, the steering control interface 124 is operable to utilize the wheel angle command 123 to turn the front wheel 114 the determined degrees. In addition, the controller 122 communicates with the path interface 126 to operate the user display 106 to transmit and display the projected path (block 1218). For example, the controller 122 transmit the path display data 125 (e.g., transmits path projection data, is transmitting path projection data, etc.) to the user display 106. In examples disclosed herein, such path display data 125 includes the determined steering angle for use in displaying the projected path of the vehicle 102 on the user display 106. In response, control returns the block 1202 to monitor the GNSS signal and accordingly block 1204 to determine whether the vehicle 102 is off the desired path greater than a threshold distance.

As mentioned above, if the control of block 1204 returns NO, then control proceeds to block 1220 in which the controller 122 generates a signal to enter tracking mode (block 1220). For example, the controller 122 generates a signal for the tracking mode controller 128 indicating to enter tracking mode. In response, the vehicle control network 104a and/or the vehicle control network 104b determines whether to continue operating (block 1222). If the control executed in block 1222 returns YES (e.g., the vehicle control network 104a and/or the vehicle control network 104b determines to continue operating), then control proceeds to block 1202. Alternatively, if the control executed in block 1222 returns NO (e.g., the vehicle control network 104a and/or the vehicle control network 104b determines not to continue operating), then control stops. In examples disclosed herein, the control executed in block 1222 may return NO (e.g., the vehicle control network 104a and/or the vehicle control network 104b determines not to continue operating) during a loss of power event, shut off signal, etc.

Figure 13:
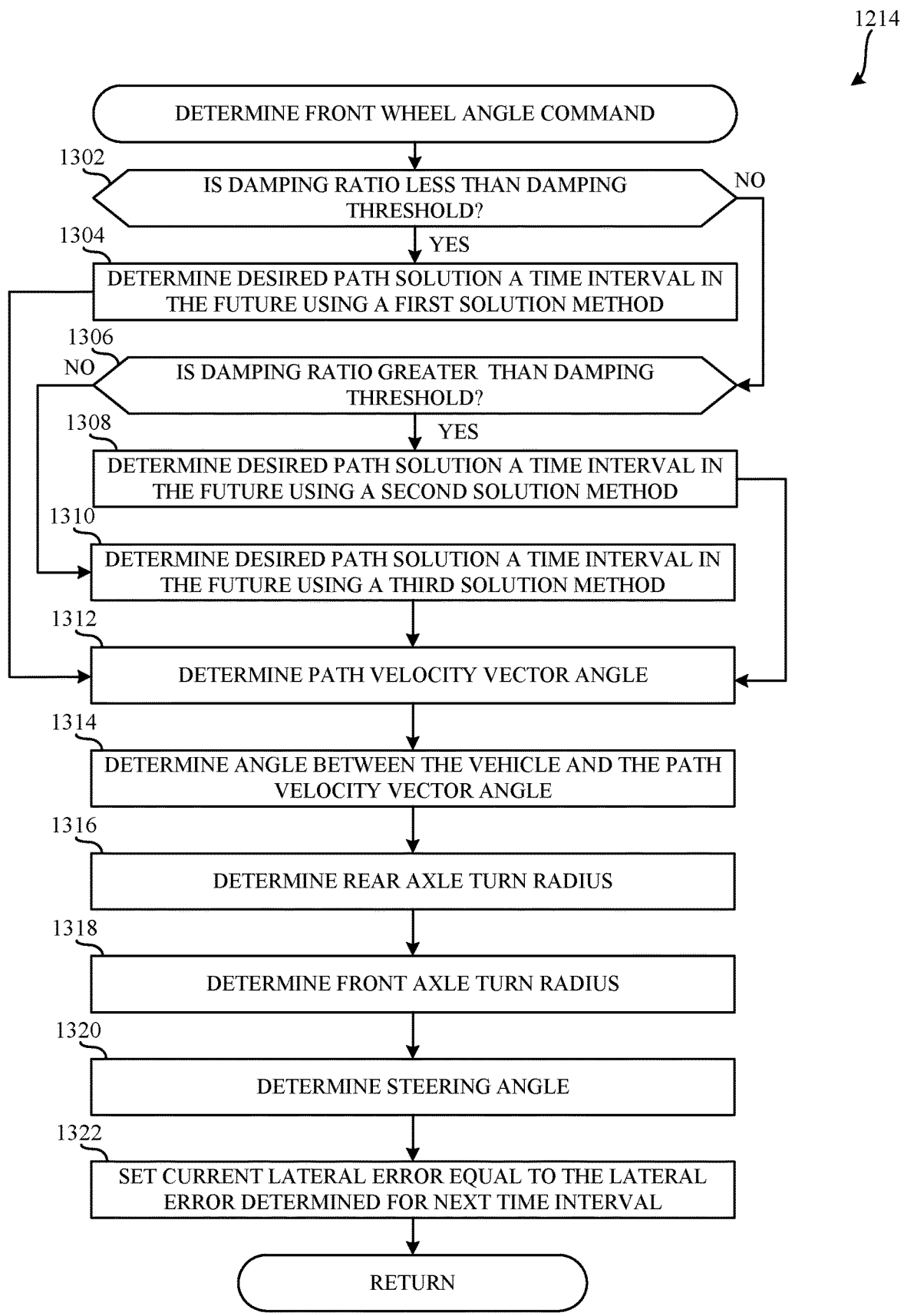
FIG. 13 is a flowchart representative of machine readable instruction that may be executed to implement the example controller of FIG. 1 to determine the wheel angle command for the front wheel of a front steering vehicle.

FIG. 13 is a flowchart representative of machine readable instructions that may be executed to implement the example controller 122 of FIG. 1 to determine the wheel angle command 123 for the front wheel 114. In FIG. 13, the damping ratio determiner 403 determines whether the damping ratio is less than the damping threshold (block 1302). For example, if the damping threshold is 1.0, then the control executed in block 1302 will return YES if the damping ratio is 0.9, 0.8, 0.3, etc. If the control executed in block 1302 returns YES, the path determiner 402 determines the desired path solution a time interval in the future using a first solution method (block 1304). In examples disclosed herein, the first solution method may be the solution method illustrated in FIG. 5A. If the control executed in block 1302 returns NO, the damping ratio determiner 403 determines whether the damping ratio is greater than the damping threshold (block 1306). For example, if the damping threshold is 1.0, then the control executed in block 1306 will return YES if the damping ratio is 1.1, 1.5, 1.6, etc. If the control executed in block 1306 returns YES, the path determiner 402 determines the desired path solution a time interval in the future using a second solution method (block 1308). In examples disclosed herein, the second solution method may be the solution method illustrated in FIG. 5C.

Alternatively, if the control executed in block 1306 returns NO, then the path determiner 402 determines the desired path solution a time interval in the future using a third solution method (block 1310). In examples disclosed herein, the third solution method may be the solution method illustrated in FIG. 5B. The control executed in either block 1304, block 1308, or block 1310 illustrate the path determiner 402 executing Equations 1-3 and/or Equations 9-11.

In response, the wheel angle determiner 404 determines the path velocity vector angle (block 1312). For example, the wheel angle determiner 404 may utilize and/or otherwise solve Equation 4 to determine the path velocity vector angle. The wheel angle determiner 404 then determines the angle between the front steer vehicle (e.g., the vehicle 102) and the path velocity vector angle (block 1314). For example, the wheel angle determiner 404 may utilize and/or otherwise solve Equation 5 to determine the angle between the front steer vehicle (e.g., the vehicle 102) and the path velocity vector angle. In addition, the wheel angle determiner 404 determines the rear axle turn radius (block 1316). For example, the wheel angle determiner 404 may utilize and/or otherwise solve Equation 6 to determine the rear axle turn radius. Moreover, the wheel angle determiner 404 determines the front axle turn radius (block 1318). For example, the wheel angle determiner 404 may utilize and/or otherwise solve Equation 7 to determine the front axle turn radius.

Having executed the control of blocks 1312-1318, the wheel angle determiner 404 determines the steering angle (block 1320). For example, the wheel angle determiner 404 may utilize and/or otherwise solve Equation 8 to determine the steering angle. In response, the path determiner 402 sets the current lateral error equal to the lateral error determined for the time interval (block 1322). After the control of block 1322 is executed, the process returns to block 1216 of FIG. 12.

Figure 14:
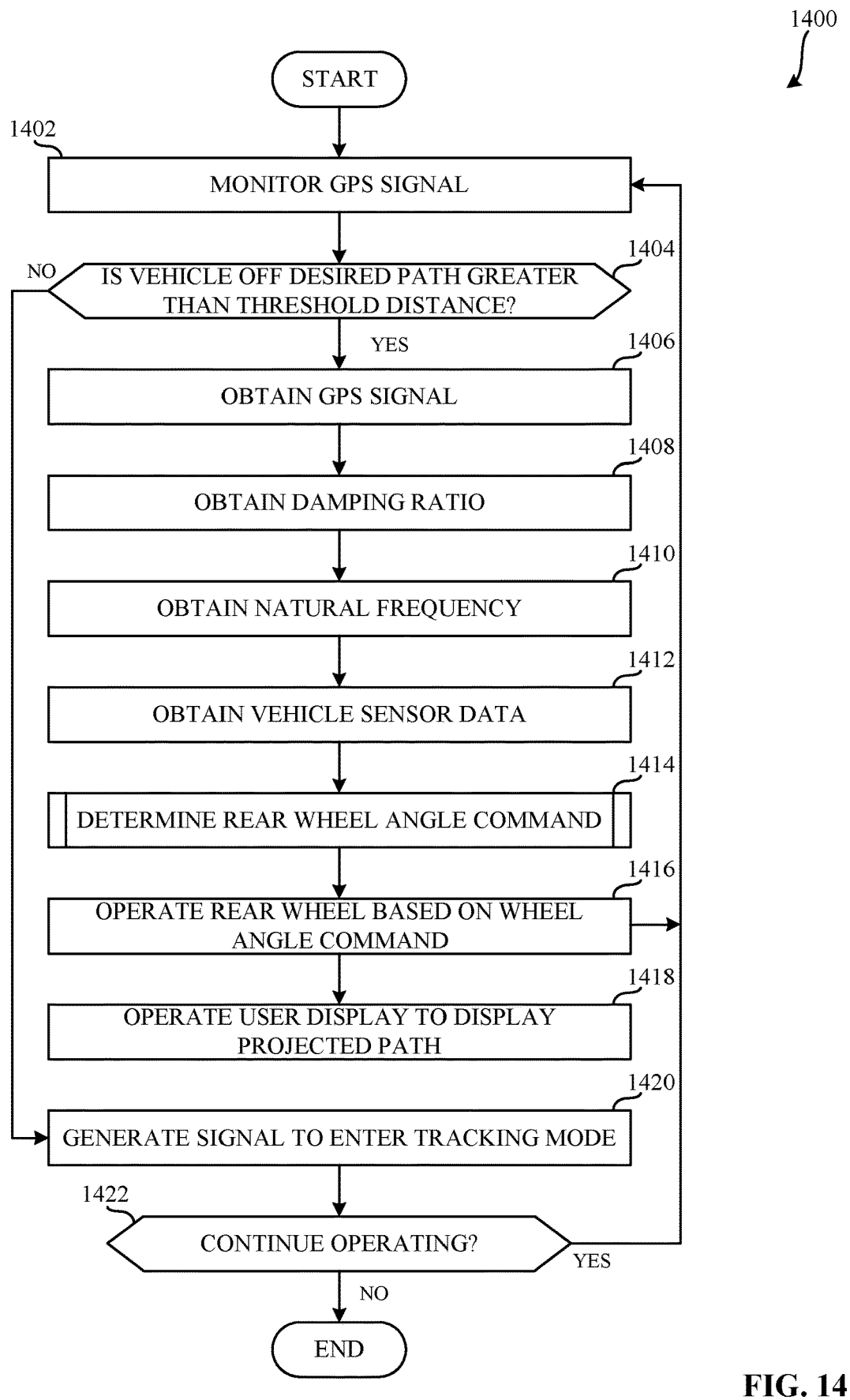
FIG. 14 is a flowchart representative of machine readable instructions that may be executed to implement the example vehicle control network of FIG. 1 to control the steering of a rear steering vehicle.

FIG. 14 is a flowchart representative of machine readable instructions 1400 the may be executed to implement the example vehicle control network 104a and/or the example vehicle control network 104b of FIG. 1 to control the steering of a rear steer vehicle (e.g., the vehicle 102 of FIG. 1). In the example instructions 1400 illustrated in FIG. 14, the GNSS receiver 118 monitors a GNSS signal of the rear steer vehicle (e.g., the vehicle 102) (block 1402). For example, the GNSS receiver 118 monitors a GNSS signal representative of the location of the GNSS receiver 118. Moreover, the path determiner 402 determines whether the vehicle is off the desired path greater than (e.g., more than) a desired threshold distance (block 1404). In response to the control executed in block 1404 returning NO, then control proceeds to block 1420 to enter tracking mode. Alternatively, in response to the control executed in block 1404 returning YES, then the example path determiner 402 of the controller 122 obtains and/or otherwise receives the GNSS signal from the GNSS receiver 118 (block 1406). In examples disclosed herein, the GNSS signal includes a lateral error indication representative of the distance between the GNSS receiver 118 and the desired path.

The path acquisition interface 120 then obtains the damping ratio (block 1408). For example, the path acquisition interface 120 communicates with the user display 106 to determine the damping ratio provided and/or otherwise set by a user. In addition, the path acquisition interface 120 obtains the natural frequency (block 1410). For example, the path acquisition interface 120 communicates with the user display 106 to determine the natural frequency provide and/or otherwise set by a user.

In FIG. 14, in response, equipment sensor interface 116 obtains vehicle sensor data (block 1412). For example, the equipment sensor interface 116 may obtain data indicating the velocity of the vehicle and/or any suitable sensor data related to the rear steer vehicle (e.g., the vehicle 102). In response to the control of block 1412, the controller 122 determines the wheel angle command 123 (block 1414). The control executed by the controller 122 to determine the wheel angle command 123 is explained in further detail below in connection with FIG. 15.

In the example of FIG. 14, the controller 122 communicates with the steering control interface 124 the wheel angle command 123 to operate the rear wheel 112 (block 1416). For example, the steering control interface 124 is operable to utilize the wheel angle command 123 to turn (e.g., angle) the rear wheel 112 the determined degrees. In addition, the controller 122 communicates with the path interface 126 to operate the user display 106 to display the projected path (block 1418). For example, the controller 122 transmits the path display data 125 (e.g., transmits path projection data, is transmitting path projection data, etc.) to the user display 106. In examples disclosed herein, such path display data 125 includes the determined steering angle for use in displaying the projected path of the rear steer vehicle (e.g., the vehicle 102) on the user display 106. In response, control returns the block 1402 to monitor the GNSS signal and accordingly block 1404 to determine whether the rear steer vehicle (e.g., the vehicle 102) is off the desired path greater than a threshold distance.

As mentioned above, if the control of block 1404 returns NO, then control proceeds to block 1420 in which the controller 122 generates a signal to enter tracking mode (block 1420). For example, the controller 122 generates a signal for the tracking mode controller 128 indicating to enter tracking mode. In response, the vehicle control network 104a and/or the vehicle control network 104b determines whether to continue operating (block 1422). If the control executed in block 1422 returns YES (e.g., the vehicle control network 104a and/or the vehicle control network 104b determines to continue operating), then control proceeds to block 1402. Alternatively, if the control executed in block 1422 returns NO (e.g., the vehicle control network 104a and/or the vehicle control network 104b determines not to continue operating), then control stops. In examples disclosed herein, the control executed in block 1422 may return NO (e.g., the vehicle control network 104a and/or the vehicle control network 104b determines not to continue operating) during a loss of power event, shut off signal, etc.

Figure 15:
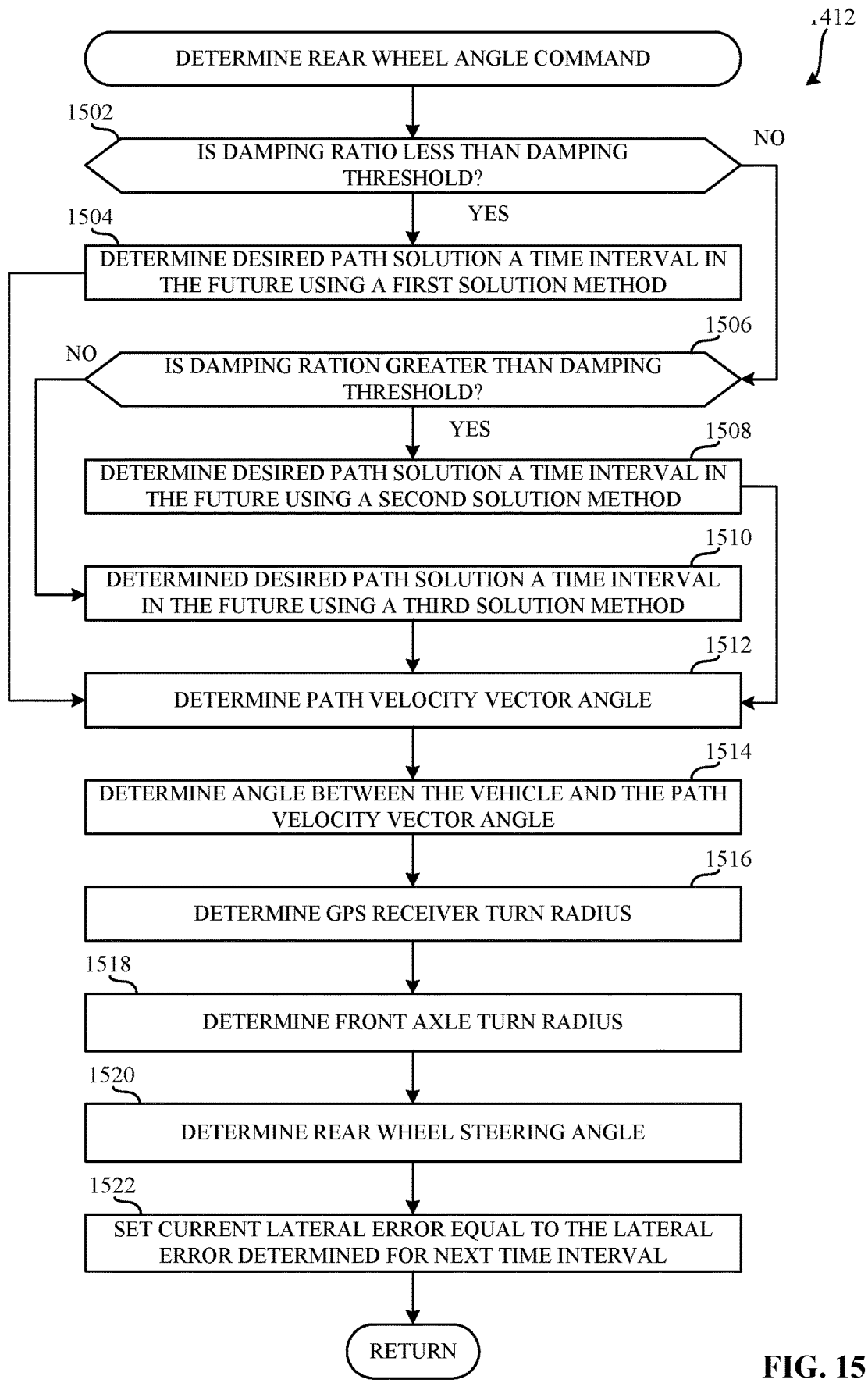
FIG. 15 is a flowchart representative of machine readable instruction that may be executed to implement the example controller of FIG. 1 to determine the wheel angle command for the rear wheel of a rear steering vehicle.

FIG. 15 is a flowchart representative of machine readable instruction that may be executed to implement the example controller 122 of FIG. 1 to determine the wheel angle command 123 for the rear wheel 112. In FIG. 15, the damping ratio determiner 403 determines whether the damping ratio is less than the damping threshold (block 1502). For example, if the damping threshold is 1.0, then the control executed in block 1502 will return YES if the damping ratio is 0.9, 0.8, 0.3, etc. If the control executed in block 1502 returns YES, the path determiner 402 determines the desired path solution a time interval in the future using a first solution method (block 1504). In examples disclosed herein, the first solution method may be the solution method illustrated in FIG. 5A. If the control executed in block 1502 returns NO, the damping ratio determiner 403 determines whether the damping ratio is greater than the damping threshold (block 1506). For example, if the damping threshold is 1.0, then the control executed in block 1506 will return YES if the damping ratio is 1.1, 1.5, 1.6, etc. If the control executed in block 1506 returns YES, the path determiner 402 determines the desired path solution a time interval in the future using a second solution method (block 1508). In examples disclosed herein, the second solution method may be the solution method illustrated in FIG. 5C.

Alternatively, if the control executed in block 1506 returns NO, then the path determiner 402 determines the desired path solution a time interval in the future using a third solution method (block 1510). In examples disclosed herein, the third solution method may be the solution method illustrated in FIG. 5B. The control executed in either block 1504, block 1508, or block 1510 illustrate the path determiner 402 executing Equations 1-3 and/or Equations 9-11.

In response, the wheel angle determiner 404 determines the path velocity vector angle (block 1512). For example, the wheel angle determiner 404 may utilize and/or otherwise solve Equation 12 to determine the path velocity vector angle. The wheel angle determiner 404 then determines the angle between the rear steer vehicle (e.g., the vehicle 102) and the path velocity vector angle (block 1514). For example, the wheel angle determiner 404 may utilize and/or otherwise solve Equation 13 to determine the angle between the rear steer vehicle (e.g., the vehicle 102) and the path velocity vector angle. In addition, the wheel angle determiner 404 determines the GNSS receiver turn radius (block 1516). For example, the wheel angle determiner 404 may utilize and/or otherwise solve Equation 14 to determine the GNSS receiver turn radius. Moreover, the wheel angle determiner 404 determines the front axle turn radius (block 1518). For example, the wheel angle determiner 404 may utilize and/or otherwise solve Equation 15 to determine the front wheel axle turn radius.

Having executed the control of blocks 1512-1518, the wheel angle determiner 404 determines the rear wheel steering angle (block 1520). For example, the wheel angle determiner 404 may utilize and/or otherwise solve Equation 16 to determine the rear wheel steering angle. In response, the path determiner 402 sets the current lateral error equal to the lateral error determined for the time interval (block 1522). After the control of block 1522 is executed, the process returns to block 1416 of FIG. 14.

Figure 16:
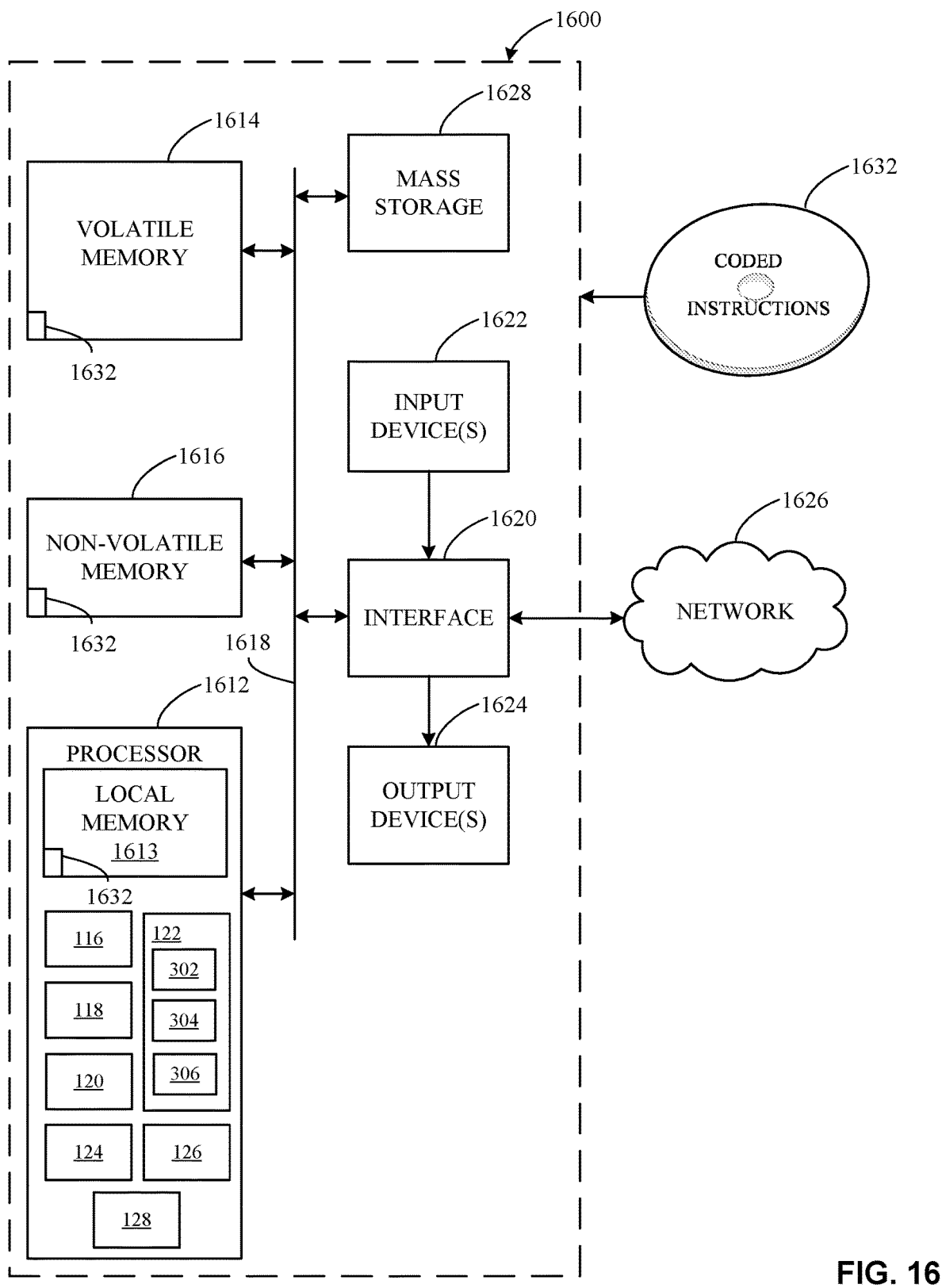
FIG. 16 is a block diagram of an example processing platform structured to execute the instructions of FIGS. 12-15 to implement the vehicle control network of FIGS. 1 and 4.

FIG. 16 is a block diagram of an example processing platform structured to execute the instructions of FIGS. 12-15 to implement the vehicle control network 104a and/or the vehicle control network 104b of FIG. 1 to control a front steer vehicle and/or a rear steer vehicle. The processor platform 1600 can be, for example, a server, a personal computer, a controller located in a vehicle, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example equipment sensor interface 116, the example GNSS receiver 118, the example path acquisition interface 120, the example controller 122, the example steering control interface 124, the example path interface 126, the tracking mode controller 128, the example path determiner 402, the example wheel angle determiner 404, the example display path generator 406, and/or, more generally, the example vehicle control network 104a and/or the example vehicle control network 104b of FIG. 1.

The processor 1612 of the illustrated example includes a local memory 1213 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIGS. 12-15 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that determine a path to follow as a vehicle acquires a guidance line. The disclosed methods, apparatus and articles of manufacture improve the efficiency of using a computing device by determining a wheel angle command that is required to cause a GNSS receiver of a vehicle to acquire a path in real time. The disclosed methods, apparatus and articles of manufacture improve the efficiency of using a computing device by at least accounting for any slippage that may occur due to environmental conditions and reducing the memory and logic used to control a vehicle when acquiring a desired path. The disclosed methods, apparatus and articles of manufacture are accordingly directed to one or more improvement(s) in the functioning of a computer.

Example methods, apparatus, systems, and articles of manufacture to control vehicle steering are disclosed herein. Further examples and combinations thereof include the following:

Example 1 includes an apparatus to control vehicle steering, the apparatus comprising a path acquisition interface configured to obtain, via a user interface a sampling interval, and a controller configured to, during acquisition mode determine a steering angle of a wheel of the vehicle based on a trigonometric function including a distance associated with a turn radius of a front wheel of the vehicle, and cause, utilizing the steering angle, a global navigation satellite system (GNSS) receiver to travel from a first position to a second position, the GNSS receiver located at the first position at a first sampling time and the second position at a second sampling time, the first sampling time and the second sampling time differing by the sampling interval.

Example 2 includes the apparatus of example 1, wherein the wheel is the front wheel, the trigonometric function is an inverse sine operation, the distance is a first distance, the turn radius is a first turn radius, and the first distance is based on a second distance associated with a second turn radius of a rear wheel of the vehicle and a third distance between the front wheel and the rear wheel.

Example 3 includes the apparatus of example 1, wherein the distance is a first distance, and wherein the controller is configured to determine the steering angle based on an inverse sine operation including a second distance between the front wheel and a rear wheel of the vehicle divided by the first distance.

Example 4 includes the apparatus of example 1, wherein the GNSS receiver is positioned in between a rear wheel and the front wheel of the vehicle.

Example 5 includes the apparatus of example 1, wherein the wheel is a rear wheel, the trigonometric function is an inverse tangent operation, the distance is a first distance, the turn radius is a first turn radius, and the first distance is based on a second distance associated with a second turn radius of the GNSS receiver and a third distance between the GNSS receiver and the front wheel.

Example 6 includes the apparatus of example 1, wherein the wheel is a rear wheel, the distance is a first distance, and the controller is configured to determine the steering angle of the rear wheel of the vehicle based on an inverse tangent operation including the first distance divided by a second distance between the front wheel and the rear wheel.

Example 7 includes the apparatus of example 1, wherein the steering angle is offset by a constant value associated with half of a range associated with the steering angle.

Example 8 includes the apparatus of example 1, wherein the GNSS receiver is positioned ahead of the front wheel of the vehicle.

Example 9 includes the apparatus of example 1, wherein the path acquisition interface further obtains a damping ratio and a natural frequency.

Example 10 includes the apparatus of example 1, wherein the first position is a geographical position of the GNSS receiver.

Example 11 includes the apparatus of example 1, wherein the controller is configured to determine the steering angle without using controller gains.

Example 12 includes the apparatus of example 1, wherein the controller further includes a display path generator configured to transmit path projection data to a user display in the vehicle.

Example 13 includes a non-transitory computer readable storage medium comprising instructions which, when executed, cause one or more processors to at least obtain, via a user interface a sampling interval, determine, while operating in acquisition mode, a steering angle of a wheel of a vehicle based on a trigonometric function including a distance associated with a turn radius of a front wheel of the vehicle, and cause, utilizing the steering angle, a global navigation satellite system (GNSS) receiver to travel from a first position to a second position, the GNSS receiver located at the first position at a first sampling time and the second position at a second sampling time, the first sampling time and the second sampling time differing by the sampling interval.

Example 14 includes the non-transitory computer readable storage medium of example 13, wherein the wheel is the front wheel, the trigonometric function is an inverse sine operation, the distance is a first distance, the turn radius is a first turn radius, and the first distance is based on a second distance associated with a second turn radius of a rear wheel of the vehicle and a third distance between the front wheel and the rear wheel.

Example 15 includes the non-transitory computer readable storage medium of example 13, wherein the distance is a first distance, and wherein the instructions cause the one or more processors to determine the steering angle based on an inverse sine operation including a second distance between the front wheel and a rear wheel of the vehicle divided by the first distance.

Example 16 includes the non-transitory computer readable storage medium of example 13, wherein the GNSS receiver is positioned in between a rear wheel and the front wheel of the vehicle.

Example 17 includes the non-transitory computer readable storage medium of example 13, wherein the wheel is a rear wheel, the trigonometric function is an inverse tangent operation, the distance is a first distance, the turn radius is a first turn radius, and the first distance is based on a second distance associated with a second turn radius of the GNSS receiver and a third distance between the GNSS receiver and the front wheel.

Example 18 includes the non-transitory computer readable storage medium of example 13, wherein the wheel is a rear wheel, the distance is a first distance, and the instruction cause the one or more processors to determine the steering angle of the rear wheel of the vehicle based on an inverse tangent operation including the first distance divided by a second distance between the front wheel and the rear wheel.

Example 19 includes the non-transitory computer readable storage medium of example 13, wherein the steering angle is offset by a constant value associated with half of a range associated with the steering angle.

Example 20 includes the non-transitory computer readable storage medium of example 13, wherein the GNSS receiver is positioned ahead of the front wheel of the vehicle.

Example 21 includes the non-transitory computer readable storage medium of example 13, wherein the instructions cause the one or more processors to obtain a damping ratio and a natural frequency.

Example 22 includes the non-transitory computer readable storage medium of example 13, wherein the first position is a geographical position of the GNSS receiver.

Example 23 includes the non-transitory computer readable storage medium of example 13, wherein the instruction cause the one or more processors to determine the steering angle without using controller gains.

Example 24 includes the non-transitory computer readable storage medium of example 13, wherein the instructions cause the one or more processors to transmit path projection data to a user display in the vehicle.

Example 25 includes a method to control vehicle steering, the method comprising obtaining, via a user interface a sampling interval, determining, while operating in acquisition mode, a steering angle of a wheel of the vehicle based on a trigonometric function including a distance associated with a turn radius of a front wheel of the vehicle, and causing, utilizing the steering angle, a global navigation satellite system (GNSS) receiver to travel from a first position to a second position, the GNSS receiver located at the first position at a first sampling time and the second position at a second sampling time, the first sampling time and the second sampling time differing by the sampling interval.

Example 26 includes the method of example 25, wherein the wheel is the front wheel, the trigonometric function is an inverse sine operation, the distance is a first distance, the turn radius is a first turn radius, and the first distance is based on a second distance associated with a second turn radius of a rear wheel of the vehicle and a third distance between the front wheel and the rear wheel.

Example 27 includes the method of example 25, wherein the distance is a first distance, and the method further includes determining the steering angle based on an inverse sine operation including a second distance between the front wheel and a rear wheel of the vehicle divided by the first distance.

Example 28 includes the method of example 25, wherein the GNSS receiver is positioned in between a rear wheel and the front wheel of the vehicle.

Example 29 includes the method of example 25, wherein the wheel is a rear wheel, the trigonometric function is an inverse tangent operation, the distance is a first distance, the turn radius is a first turn radius, and the first distance is based on a second distance associated with a second turn radius of the GNSS receiver and a third distance between the GNSS receiver and the front wheel.

Example 30 includes the method of example 25, wherein the wheel is a rear wheel, the distance is a first distance, and the method further includes determining the steering angle of the rear wheel of the vehicle based on an inverse tangent operation including the first distance divided by a second distance between the front wheel and the rear wheel.

Example 31 includes the method of example 25, wherein the steering angle is offset by a constant value associated with half of a range associated with the steering angle.

Example 32 includes the method of example 25, wherein the GNSS receiver is positioned ahead of the front wheel of the vehicle.

Example 33 includes the method of example 25, further including obtaining a damping ratio and a natural frequency.

Example 34 includes the method of example 25, wherein the first position is a geographical position of the GNSS receiver.

Example 35 includes the method of example 25, further including determining the steering angle without using controller gains.

Example 36 includes the method of example 25, further including transmitting path projection data to a user display in the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to control vehicle steering, the apparatus comprising:
   a path acquisition interface configured to obtain, via a user interface a sampling interval; and
   a controller configured to, during acquisition mode, at least:
      determine a first distance associated with a turn radius of a front wheel of the vehicle;
      determine a steering angle of a rear wheel of the vehicle based on an inverse tangent operation including the first distance divided by a second distance between the front wheel and the rear wheel;
      cause, utilizing the steering angle, a global navigation satellite system (GNSS) receiver to travel from a first position to a second position, the GNSS receiver located at the first position at a first sampling time and the second position at a second sampling time, the first sampling time and the second sampling time differing by the sampling interval;
      after the GNSS receiver travels from the first position to the second position, measure a lateral error at the second position to determine a third distance of the vehicle from a desired path; and
      based on the lateral error being above a threshold distance, determine a second steering angle.

2. The apparatus of claim 1, wherein the turn radius is a first turn radius, the first distance is based on (a) a fourth distance associated with a second turn radius of the rear wheel of the vehicle and (b) the second distance between the front wheel and the rear wheel, and the controller is configured to determine a third steering angle of the front wheel based on an inverse sine operation including the first distance.

3. The apparatus of claim 1, wherein the controller is configured to determine a third steering angle of the front wheel based on an inverse sine operation including the second distance between the front wheel and the rear wheel of the vehicle divided by the first distance.

4. The apparatus of claim 1, wherein the GNSS receiver is positioned at least one of in front of or behind the front wheel of the vehicle.

5. The apparatus of claim 1, wherein the the turn radius is a turn radius, and the first distance is based on a fourth distance associated with a second trun radius of the GNSS receiver and a fifth distance between the GNSS receiver and an axle of the vehicle, the GNSS receiver located at least one of in front of or behind the axle of the vehicle.

6. The apparatus of claim 1, wherein the steering angle is offset by a constant value associated with half of a range associated with the steering angle.

7. The apparatus of claim 1, wherein the first distance is based on a fourth distance between the GNSS receiver and an axle of the vehicle, the GNSS receiver located at least one of in front of or behind the axle of the vehicle.

8. A non-transitory computer readable storage medium comprising instructions which, when executed, cause one or more processors to at least:
   obtain, via a user interface a sampling interval;
   determine, while operating in acquisition mode, a first distance associated with a turn radius of a front wheel of the vehicle;
   determine, while operating in the acquisition mode, a first steering angle of a rear wheel of the vehicle based on an inverse tangent operating including the first distance divided by a second distance between the front wheel and the rear wheel;
   cause, utilizing the frist steering angle, a global navigation satellite system (GNSS) receiver to travel from a first position to a second position, the GNSS receiver located at the first position at a first sampling time and the second position at a second sampling time, the first sampling time and the second sampling time differing by the sampling interval;
   after the GNSS receiver travels from the first position to the second position, measure a lateral error at the second position to determine a third distance of the vehicle from a desired path; and based on the lateral error being above a threshold distance, determine a second steering angle.

9. The non-transitory computer readable storage medium of claim 8, wherein the turn radius is a first turn radius, the first distance is based on (a) a fourth distance associated with a second turn radius of the rear wheel of the vehicle and (b) the second distance between the front wheel and the rear wheel, and the instructions cause the one or more processors to determine a third steering angle of the front wheel based on an inverse sine operation including the first distance.

10. The non-transitory computer readable storage medium of claim 8, wherein the instructions cause the one or more processors to determine a third steering angle of the front wheel based on an inverse sine operation including the second distance between the front wheel and the rear wheel of the vehicle divided by the first distance.

11. The non-transitory computer readable storage medium of claim 8, wherein the GNSS receiver is positioned at least one of in front of or behind the front wheel of the vehicle.

12. The non-transitory computer readable storage medium of claim 8, wherein the turn radius is a first turn radius, and the first distance is based on a fourth distance associated with a second turn radius of the GNSS receiver and a fifth distance between the GNSS receiver and an axle of the vehicle, the GNSS receiver located at least one of in front of or behind the axle of the vehicle.

13. The non-transitory computer readable storage medium of claim 8, wherein the first steering angle is offset by a constant value associated with half of a range associated with the steering angle.

14. The non-transitory computer readable storage medium of claim 8, wherein the first distance is based on a fourth distance between the GNS receiver and an axle of the vehicle, the GNSS receiver located at least one of in front of or behind the axle of the vehicle.

15. A method to control vehicle steering, the method comprising:
  obtaining, via a user interface a sampling interval;
  determining, while operating in acquisition mode, a first distance associated with a turn radius of a front wheel of the vehicle;
  determining, while operating in the acquisition mode, a first steering angle of a rear wheel of the vehicle based on an inverse tangent operation including the first distance divided by a second distance between the front wheel and the rear wheel;
  causing, utilizing the first steering angle, a global navigation satellite system (GNSS) receiver to travel from a first position to a second position, the GNSS receiver located at the first position at a first sampling time and the second position at a second sampling time, the first sampling time and the second sampling time differing by the sampling interval;
  after the GNSS receiver travels from the first position to the second position, measuring a lateral error at the second position to determine a third distance of the vehicle from a desired path; and
  based on the lateral error being above a threshold distance, determining a second steering angle.

16. The method of claim 15, wherein the turn radius is a first turn radius, the first distance is based on (a) a fourth distance associated with a second turn radius of the rear wheel of the vehicle and (b) the second distance between the front wheel and the rear wheel, and the method further includes determining a third steering angle of the front wheel based on an inverse sine operation including the first distance.

17. The method of claim 15, further including determining a third steering angle of the front wheel based on an inverse sine operation including the second distance between the front wheel and the rear wheel of the vehicle divided by the first distance.

18. The method of claim 15, wherein the sampling interval corresponds to a level of aggressiveness at which the first steering angle is determined.

19. The method of claim 15, wherein the turn radius is a first turn radius, and the first distance is based on a fourth distance associated with a second turn radius of the GNSS receiver and a fifth distance between the GNSS receiver and an axle of the vehicle, the GNSS receiver located at least one of in front of or behind the axle of the vehicle.

20. The method of claim 15, wherein the first distance is based on a fourth distance between the GNSS receiver and an axle of the vehicle, the GNSS receiver located at least one of in front of or behind the axle of the vehicle.

* * * * *

UNITED STATES PATENT AND TRADEMARK OFFICE
CERTIFICATE OF CORRECTION

PATENT NO. : 12,016,255 B2  
APPLICATION NO. : 16/906853  
DATED : June 25, 2024  
INVENTOR(S) : William Daniel Robinson Page 1 of 1

It is certified that error appears in the above-identified patent and that said Letters Patent is hereby corrected as shown below:

In the Claims

In Column 35, Claim 1, Line 60, delete "a path acquisition interface" and insert -- path acquisition interface circuitry --.
In Column 35, Claim 1, Line 61, insert -- , -- after the text "interface".
In Column 35, Claim 1, Line 62, insert -- an -- before the text "acquisition mode".
In Column 35, Claim 1, Line 66, insert -- first -- before the text "steering angle".
In Column 36, Claim 1, Line 3, insert -- first -- before the text "steering angle".
In Column 36, Claim 5, Line 32, amend "the the turn radius" to "the turn radius".
In Column 36, Claim 5, Line 33, insert -- first -- before the text "turn radius".
In Column 36, Claim 5, Line 34, delete "trun" and insert -- turn --.
In Column 36, Claim 6, Line 38, insert -- first -- before the text "steering angle".
In Column 36, Claim 6, Line 40, insert -- first -- before the text "steering angle".
In Column 36, Claim 8, Line 48, insert -- , -- after the text "user interface".
In Column 36, Claim 8, Line 49, insert -- an -- before the text "acquisition mode".
In Column 36, Claim 8, Line 51, delete "the vehicle" and insert -- a vehicle --.
In Column 36, Claim 8, Line 54, delete "operating" and insert -- operation --.
In Column 36, Claim 8, Line 57, delete "frist" and insert -- first --.
In Column 37, Claim 13, Line 30, insert -- first -- before the text "steering angle".
In Column 37, Claim 14, Line 33, delete "GNS" and insert -- GNSS --.
In Column 37, Claim 15, Line 38, insert -- , -- after the text "user interface".
In Column 37, Claim 15, Line 39, insert -- an -- before the text "acquisition mode".

Signed and Sealed this  
Fourth Day of March, 2025

Coke Morgan Stewart  
*Acting Director of the United States Patent and Trademark Office*